US012759238B2

(12) United States Patent
Kutchko et al.

(10) Patent No.: US 12,759,238 B2
(45) Date of Patent: Oct. 13, 2026

(54) SYSTEM FOR RAPID OBJECT PRODUCTION USING FLOW INFILL DESIGN

(71) Applicant: PPG Industries Ohio, Inc., Cleveland, OH (US)

(72) Inventors: Cynthia Kutchko, Pittsburgh, PA (US); Bryan William Wilkinson, Pittsburgh, PA (US); Michael Anthony Bubas, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 29 days.

(21) Appl. No.: 18/003,934

(22) PCT Filed: May 3, 2021

(86) PCT No.: PCT/US2021/030455

§ 371 (c)(1),
(2) Date: Dec. 30, 2022

(87) PCT Pub. No.: WO2022/005596

PCT Pub. Date: Jan. 6, 2022

(65) Prior Publication Data

US 2023/0256678 A1 Aug. 17, 2023

Related U.S. Application Data

(60) Provisional application No. 63/047,661, filed on Jul. 2, 2020.

(51) Int. Cl.
*B29C 64/393* (2017.01)
*B29C 64/209* (2017.01)
(Continued)

(52) U.S. Cl.
CPC .......... *B29C 64/393* (2017.08); *B29C 64/209* (2017.08); *B29K 2101/12* (2013.01); *B33Y 10/00* (2014.12); *B33Y 50/02* (2014.12)

(58) Field of Classification Search
CPC ............................ B29C 64/393; B29C 64/209
See application file for complete search history.

(56) References Cited

U.S. PATENT DOCUMENTS 3,383,244 A 5/1968 Cassman
3,512,894 A 5/1970 Wood
(Continued)

FOREIGN PATENT DOCUMENTS

AU 2002323712 A2 4/2003
AU 0763277 B2 7/2003
(Continued)

OTHER PUBLICATIONS

International Search Report and Written Opinion received for PCT Application Serial No. PCT/US2021/030441 dated Jan. 24, 2022, 17 pages.
(Continued)

*Primary Examiner* — Andrew D Graham

(57) ABSTRACT

A computer system for part production using flow infill design receives a computer-aided design file that describes physical dimensions of a target object (120). The computer system identifies a physical boundary portion (300) of the target object within the CAD file. The computer system generates a first tool path to additively manufacture the physical boundary portion (300). Additionally, the computer system sends instructions to a computer system in communication with a dispenser (130) that cause the dispenser to implement the first tool path while dispensing a boundary material. Further, the computer system generates a com-
(Continued)

mand to dispense the coreactive infill material (310) within the physical boundary portion.

16 Claims, 6 Drawing Sheets

(51) Int. Cl.
*B29K 101/12* (2006.01)
*B33Y 10/00* (2015.01)
*B33Y 50/02* (2015.01)

(56) References Cited

U.S. PATENT DOCUMENTS 4,253,566 A 3/1981 Seemann
4,403,866 A 9/1983 Falcoff et al.
4,620,852 A 11/1986 Nishikawa et al.
4,745,468 A 5/1988 Von Kohorn
4,900,611 A 2/1990 Carroll, Jr.
5,083,591 A 1/1992 Edwards et al.
5,132,788 A 7/1992 Hirota
5,177,694 A 1/1993 Graham et al.
5,303,574 A 4/1994 Matossian et al.
5,578,813 A 11/1996 Allen et al.
5,592,597 A 1/1997 Kiss
5,643,341 A 7/1997 Hirsch et al.
5,649,259 A 7/1997 Hylen
5,753,044 A 5/1998 Hanawa et al.
5,774,357 A 6/1998 Hoffberg et al.
5,823,951 A 10/1998 Messerschmidt
5,825,402 A 10/1998 Swartz
5,852,590 A 12/1998 de la Huerga
5,895,608 A 4/1999 Lee et al.
5,897,239 A 4/1999 Caruthers et al.
5,907,495 A 5/1999 Snyder et al.
5,929,998 A 7/1999 Kettler et al.
5,938,648 A 8/1999 Lavon et al.
5,941,769 A 8/1999 Order
5,971,767 A 10/1999 Kaufman et al.
5,987,168 A 11/1999 Decker et al.
5,991,081 A 11/1999 Haaland et al.
5,997,670 A 12/1999 Walter et al.
6,002,893 A 12/1999 Caruthers et al.
6,040,913 A 3/2000 Johnson
6,045,759 A 4/2000 Ford et al.
6,059,354 A 5/2000 Rajasingham
6,137,594 A 10/2000 Decker et al.
6,141,598 A 10/2000 Nam
6,143,248 A 11/2000 Kellogg et al.
6,152,597 A 11/2000 Potega
6,195,150 B1 2/2001 Silverbrook
6,217,165 B1 4/2001 Silverbrook
6,221,145 B1 4/2001 McClain
6,238,614 B1 * 5/2001 Yang .................... B33Y 30/00 419/10
6,241,858 B1 6/2001 Phillips et al.
6,249,369 B1 6/2001 Theiste et al.
6,307,526 B1 10/2001 Mann
6,315,200 B1 11/2001 Silverbrook et al.
6,316,869 B1 11/2001 Kim et al.
6,317,192 B1 11/2001 Silverbrook et al.
6,331,946 B1 12/2001 Silverbrook et al.
6,354,426 B1 3/2002 Habisreitinger et al.
6,356,715 B1 3/2002 Silverbrook
6,362,869 B1 3/2002 Silverbrook
6,363,606 B1 * 4/2002 Johnson, Jr. ........... B33Y 10/00 29/854
6,373,573 B1 4/2002 Jung et al.
6,401,001 B1 * 6/2002 Jang .................... B33Y 50/02 204/192.15
6,407,847 B1 6/2002 Poll et al.
6,415,054 B1 7/2002 Silverbrook et al.
6,431,669 B1 8/2002 Silverbrook
6,459,495 B1 10/2002 Silverbrook
6,476,863 B1 11/2002 Silverbrook
6,481,353 B1 11/2002 Geddes et al.
6,522,977 B2 2/2003 Corrigan et al.
6,539,325 B1 3/2003 Numata et al.
6,542,645 B1 4/2003 Silverbrook et al.
6,594,640 B1 7/2003 Postrel
6,627,870 B1 9/2003 Lapstun et al.
6,633,905 B1 10/2003 Anderson et al.
6,636,216 B1 10/2003 Silverbrook et al.
6,644,771 B1 11/2003 Silverbrook
6,656,040 B1 12/2003 Brosnan et al.
6,665,454 B1 12/2003 Silverbrook et al.
6,667,700 B1 12/2003 Mccanne et al.
6,673,594 B1 1/2004 Owen et al.
6,714,924 B1 3/2004 Mcclanahan
6,717,580 B1 4/2004 Tang
6,750,901 B1 6/2004 Silverbrook
6,768,488 B1 7/2004 Kotani et al.
6,772,151 B1 8/2004 Johnston et al.
6,786,420 B1 9/2004 Silverbrook
6,788,336 B1 9/2004 Silverbrook
6,831,681 B1 12/2004 Silverbrook
6,850,274 B1 2/2005 Silverbrook et al.
6,879,341 B1 4/2005 Silverbrook
6,890,475 B1 5/2005 Hatjasalo et al.
6,924,817 B2 8/2005 Rice et al.
7,050,143 B1 5/2006 Silverbrook et al.
7,123,259 B2 10/2006 Cabral et al.
7,140,723 B2 11/2006 Silverbrook
7,145,656 B2 12/2006 Rodrigues et al.
7,152,939 B2 12/2006 Silverbrook
7,173,722 B1 2/2007 Lapstun et al.
7,234,801 B2 6/2007 Silverbrook
7,325,897 B2 2/2008 Silverbrook
7,337,127 B1 2/2008 Smith et al.
7,443,434 B2 10/2008 Silverbrook
7,653,218 B1 1/2010 Malitz et al.
7,722,172 B2 5/2010 Silverbrook
8,271,242 B2 9/2012 Berlin et al.
8,407,014 B2 3/2013 Prakash et al.
8,799,036 B1 8/2014 Christensen et al.
8,872,811 B1 10/2014 Rump et al.
9,406,024 B1 8/2016 Gordon et al.
9,702,830 B1 7/2017 Akselrod et al.
9,818,205 B2 11/2017 Neisen
10,002,362 B1 6/2018 Endress et al.
10,137,642 B1 * 11/2018 Gifford ................ B29C 64/135
10,152,494 B2 12/2018 Thomas et al.
10,232,225 B1 3/2019 Oberc et al.
10,240,064 B2 3/2019 Kabagambe et al.
10,253,195 B2 4/2019 Olson et al.
10,260,232 B1 4/2019 Conboy
10,373,262 B1 8/2019 Haller et al.
10,434,704 B2 10/2019 Fenn et al.
10,613,727 B2 4/2020 Beymore et al.
10,871,888 B2 12/2020 Norris et al.
2001/0009432 A1 7/2001 Olsen et al.
2001/0010668 A1 8/2001 Kley
2001/0015548 A1 8/2001 Breed et al.
2001/0036309 A1 11/2001 Hirayama et al.
2001/0041966 A1 11/2001 Corrigan et al.
2001/0050030 A1 12/2001 Friel et al.
2001/0055462 A1 12/2001 Seibel
2002/0009601 A1 1/2002 Stachowiak
2002/0019481 A1 2/2002 Andreoli et al.
2002/0019660 A1 2/2002 Gianotti et al.
2002/0028288 A1 3/2002 Rohrbaugh et al.
2002/0030712 A1 3/2002 Silverbrook
2002/0030713 A1 3/2002 Silverbrook
2002/0032787 A1 3/2002 Overton et al.
2002/0071104 A1 6/2002 Silverbrook
2002/0080335 A1 6/2002 Silverbrook
2002/0099725 A1 7/2002 Gordon
2002/0108731 A1 8/2002 Gousse et al.
2002/0138211 A1 9/2002 Spitzer et al.
2002/0154112 A1 10/2002 Voye et al.
2002/0170890 A1 11/2002 Miller et al.
2002/0181766 A1 12/2002 Mcclanahan et al.
2002/0184167 A1 12/2002 Mcclanahan
2002/0184168 A1 12/2002 Mcclanahan et al.

(56) References Cited

U.S. PATENT DOCUMENTS

2002/0184171 A1 12/2002 Mcclanahan
2003/0062145 A1 4/2003 Frasier et al.
2003/0063388 A1 4/2003 Berman et al.
2003/0067475 A1 4/2003 Hirayama et al.
2003/0068185 A1 4/2003 Silverbrook
2003/0075223 A1 4/2003 Breed et al.
2003/0082516 A1 5/2003 Straus
2003/0090538 A1 5/2003 Silverbrook et al.
2003/0093377 A1 5/2003 Silverbrook et al.
2003/0099264 A1 5/2003 Dantus et al.
2003/0112419 A1 6/2003 Silverbrook
2003/0117496 A1 6/2003 Silverbrook
2003/0122487 A1 7/2003 Kwon
2003/0125911 A1 7/2003 Snyder et al.
2003/0149373 A1 8/2003 Reade et al.
2003/0151611 A1 8/2003 Turpin et al.
2003/0174099 A1 9/2003 Bauer et al.
2003/0175609 A1 9/2003 Combes et al.
2003/0187610 A1 10/2003 Dorrance et al.
2003/0192616 A1 10/2003 Larson et al.
2003/0205059 A1 11/2003 Roche et al.
2003/0231485 A1 12/2003 Chien
2004/0003050 A1 1/2004 Lewis
2004/0004119 A1 1/2004 Baldassari et al.
2004/0004639 A1 1/2004 Simonis
2004/0004698 A1 1/2004 Silverbrook et al.
2004/0008261 A1 1/2004 Silverbrook
2004/0008262 A1 1/2004 Silverbrook et al.
2004/0008327 A1 1/2004 Silverbrook
2004/0032363 A1 2/2004 Schantz et al.
2004/0041018 A1 3/2004 Silverbrook et al.
2004/0042662 A1 3/2004 Wilensky et al.
2004/0051753 A1 3/2004 Silverbrook
2004/0056105 A1 3/2004 Silverbrook et al.
2004/0061734 A1 4/2004 Silverbrook
2004/0065738 A1 4/2004 Silverbrook et al.
2004/0075747 A1 4/2004 Silverbrook
2004/0075821 A1 4/2004 Silverbrook
2004/0080620 A1 4/2004 Silverbrook
2004/0090553 A1 5/2004 Silverbrook
2004/0092637 A1 5/2004 Mcclanahan
2004/0119827 A1 6/2004 Silverbrook et al.
2004/0123778 A1 7/2004 Bagala
2004/0125209 A1 7/2004 Silverbrook et al.
2004/0125212 A1 7/2004 Silverbrook et al.
2004/0135504 A1 7/2004 Tamaki et al.
2004/0139889 A1 7/2004 Zimmermann et al.
2004/0141061 A1 7/2004 Silverbrook
2004/0143710 A1 7/2004 Walmsley
2004/0153437 A1 8/2004 Buchan
2004/0176188 A1 9/2004 Morgan et al.
2004/0179072 A1 9/2004 Silverbrook
2004/0181303 A1 9/2004 Walmsley
2004/0183914 A1 9/2004 Silverbrook
2004/0196513 A1 10/2004 Silverbrook
2004/0212652 A1 10/2004 Silverbrook
2004/0213482 A1 10/2004 Silverbrook
2004/0213613 A1 10/2004 Silverbrook
2004/0218048 A1 11/2004 Silverbrook
2004/0218049 A1 11/2004 Silverbrook
2004/0223010 A1 11/2004 Plunkett
2004/0233252 A1 11/2004 Silverbrook
2004/0239928 A1 12/2004 Masuda
2004/0240712 A1 12/2004 Rowe et al.
2004/0246503 A1 12/2004 Silverbrook
2004/0248307 A1 12/2004 Grof et al.
2005/0015171 A1* 1/2005 Cruz-Uribe ........... B29C 64/135
700/118
2005/0017394 A1 1/2005 Hochsmann et al.
2005/0043971 A1 2/2005 Hendrickson et al.
2005/0055582 A1 3/2005 Bazakos et al.
2005/0093909 A1 5/2005 Silverbrook
2005/0094166 A1 5/2005 Silverbrook
2005/0099445 A1 5/2005 Silverbrook
2005/0106355 A1 5/2005 Kohlman et al.
2005/0112610 A1 5/2005 Lee et al.
2005/0122399 A1 6/2005 Silverbrook et al.
2005/0127181 A1 6/2005 Silverbrook
2005/0128484 A1 6/2005 Rodrigues et al.
2005/0146583 A1 7/2005 Silverbrook
2005/0146613 A1 7/2005 Silverbrook et al.
2005/0146614 A1 7/2005 Silverbrook
2005/0150740 A1 7/2005 Finkenzeller et al.
2005/0151777 A1 7/2005 Silverbrook
2005/0151819 A1 7/2005 Silverbrook
2005/0158043 A1 7/2005 Silverbrook
2005/0160077 A1 7/2005 Howes
2005/0160316 A1 7/2005 Shipton
2005/0162456 A1 7/2005 Silverbrook
2005/0175558 A1 8/2005 Nielson et al.
2005/0179781 A1 8/2005 Silverbrook
2005/0198874 A1 9/2005 Wurm
2005/0212159 A1 9/2005 Richards et al.
2005/0264622 A1 12/2005 Silverbrook et al.
2005/0270533 A1 12/2005 Hoffmann
2005/0287354 A1 12/2005 Jennings et al.
2006/0007261 A1 1/2006 Silverbrook
2006/0008602 A1 1/2006 Mills
2006/0010066 A1 1/2006 Rosenthal et al.
2006/0012652 A1 1/2006 Silverbrook
2006/0028516 A1 2/2006 Silverbrook
2006/0054525 A1 3/2006 Dean et al.
2006/0056728 A1 3/2006 Silverbrook et al.
2006/0061777 A1 3/2006 Duggan et al.
2006/0061795 A1 3/2006 Walmsley
2006/0067592 A1 3/2006 Walmsley et al.
2006/0067651 A1 3/2006 Chui
2006/0071981 A1 4/2006 Plunkett
2006/0072030 A1 4/2006 Silverbrook
2006/0072952 A1 4/2006 Walmsley et al.
2006/0076423 A1 4/2006 Silverbrook et al.
2006/0077248 A1 4/2006 Silverbrook
2006/0085335 A1 4/2006 Crawford et al.
2006/0087525 A1 4/2006 Jackson et al.
2006/0092205 A1 5/2006 Jackson et al.
2006/0092222 A1 5/2006 Jackson et al.
2006/0093982 A1 5/2006 Wen
2006/0098042 A1 5/2006 Silverbrook et al.
2006/0098044 A1 5/2006 Jackson et al.
2006/0100317 A1 5/2006 Ratzsch et al.
2006/0125854 A1 6/2006 Jackson et al.
2006/0125855 A1 6/2006 Silverbrook et al.
2006/0125857 A1 6/2006 Silverbrook et al.
2006/0125858 A1 6/2006 Silverbrook et al.
2006/0125859 A1 6/2006 Walmsley et al.
2006/0125861 A1 6/2006 Silverbrook et al.
2006/0125863 A1 6/2006 Silverbrook et al.
2006/0125876 A1 6/2006 Walmsley et al.
2006/0132512 A1 6/2006 Walmsley et al.
2006/0132516 A1 6/2006 Walmsley et al.
2006/0132518 A1 6/2006 Jackson et al.
2006/0132521 A1 6/2006 Walmsley et al.
2006/0132525 A1 6/2006 Walmsley et al.
2006/0132822 A1 6/2006 Walmsley
2006/0136725 A1 6/2006 Walmsley
2006/0139380 A1 6/2006 Walmsley et al.
2006/0139386 A1 6/2006 Silverbrook et al.
2006/0139387 A1 6/2006 Silverbrook et al.
2006/0139388 A1 6/2006 Silverbrook et al.
2006/0139681 A1 6/2006 Walmsley
2006/0143454 A1 6/2006 Walmsley
2006/0152527 A1 7/2006 Minchew et al.
2006/0157454 A1* 7/2006 Larsson ................. B33Y 30/00
219/121.8
2006/0164451 A1 7/2006 Pulver et al.
2006/0164452 A1 7/2006 Walmsley et al.
2006/0164453 A1 7/2006 Silverbrook et al.
2006/0164455 A1 7/2006 Silverbrook et al.
2006/0164462 A1 7/2006 Silverbrook et al.
2006/0181558 A1 8/2006 Walmsley et al.
2006/0181707 A1 8/2006 Gibson et al.
2006/0183458 A1 8/2006 Sena
2006/0187251 A1 8/2006 Pulver et al.

(56) References Cited

U.S. PATENT DOCUMENTS

2006/0192315 A1* 8/2006 Farr .................... B33Y 50/02 425/375
2006/0231627 A1 10/2006 Silverbrook et al.
2006/0245632 A1 11/2006 Nisper et al.
2006/0256944 A1 11/2006 Silverbrook
2006/0274112 A1 12/2006 Jackson et al.
2006/0276367 A1 12/2006 Shah et al.
2006/0294312 A1 12/2006 Walmsley
2007/0003691 A1 1/2007 Rodrigues et al.
2007/0019016 A1 1/2007 Silverbrook et al.
2007/0035554 A1 2/2007 Mcclanahan
2007/0046955 A1 3/2007 Silverbrook
2007/0083491 A1 4/2007 Walmsley et al.
2007/0097119 A1 5/2007 Steenhoek et al.
2007/0097472 A1 5/2007 Ha
2007/0104663 A1 5/2007 Henglein et al.
2007/0105993 A1 5/2007 Germroth et al.
2007/0107773 A1 5/2007 Fork et al.
2007/0109619 A1 5/2007 Eberl et al.
2007/0139667 A1 6/2007 Russell et al.
2007/0151390 A1 7/2007 Blumenkranz et al.
2007/0156286 A1 7/2007 Yamauchi
2007/0172113 A1 7/2007 Sai et al.
2007/0201845 A1 8/2007 Silverbrook et al.
2007/0209585 A1 9/2007 Ebensberger et al.
2007/0234492 A1 10/2007 Svendsen et al.
2007/0276100 A1 11/2007 Cupta et al.
2007/0292608 A1 12/2007 Rodrigues
2008/0005855 A1 1/2008 Indusegaram et al.
2008/0006177 A1 1/2008 Indusegaram et al.
2008/0024642 A1 1/2008 Silverbrook et al.
2008/0046115 A1 2/2008 Tabellion et al.
2008/0130022 A1 6/2008 Dalal et al.
2008/0154691 A1 6/2008 Wellman et al.
2008/0169926 A1 7/2008 Reep
2008/0187708 A1 8/2008 Decker et al.
2008/0243661 A1 10/2008 Bussone et al.
2008/0293857 A1 11/2008 Crawford et al.
2008/0319868 A1 12/2008 Briscoe et al.
2009/0004126 A1 1/2009 Lowndes
2009/0032600 A1 2/2009 Lapstun et al.
2009/0042167 A1 2/2009 Van Der Zel
2009/0062427 A1 3/2009 Wright et al.
2009/0063297 A1 3/2009 Dooley et al.
2009/0135215 A1 5/2009 Silverbrook et al.
2009/0135232 A1 5/2009 Silverbrook et al.
2009/0157212 A1 6/2009 Mcclanahan et al.
2009/0157349 A1 6/2009 Walker
2009/0185014 A1 7/2009 Silverbrook
2009/0185201 A1 7/2009 Lin et al.
2009/0207255 A1 8/2009 Silverbrook
2009/0229598 A1 9/2009 Cao et al.
2009/0242636 A1 10/2009 Silverbrook
2009/0244215 A1 10/2009 Silverbrook et al.
2009/0244292 A1 10/2009 Silverbrook et al.
2009/0248199 A1 10/2009 Milhorn
2009/0251737 A1 10/2009 Silverbrook
2009/0257102 A1 10/2009 Silverbrook
2009/0262149 A1 10/2009 Silverbrook
2009/0278901 A1 11/2009 Silverbrook
2009/0295823 A1 12/2009 Henry
2009/0296112 A1 12/2009 Gil et al.
2009/0296113 A1 12/2009 Mestha et al.
2009/0309038 A1 12/2009 Balakin
2010/0003439 A1 1/2010 Michie et al.
2010/0012866 A1 1/2010 Fan et al.
2010/0019170 A1 1/2010 Hart et al.
2010/0026492 A1 2/2010 Grieco et al.
2010/0044897 A1 2/2010 Chisnall et al.
2010/0067056 A1 3/2010 Rich et al.
2010/0076613 A1 3/2010 Imes
2010/0091116 A1 4/2010 Silverbrook et al.
2010/0094601 A1 4/2010 Steenhoek
2010/0132828 A1 6/2010 Stelzl
2010/0138193 A1 6/2010 Summit et al.
2010/0170951 A1 7/2010 Silverbrook et al.
2010/0189348 A1 7/2010 Dalal et al.
2010/0213387 A1 8/2010 Safai et al.
2010/0217529 A1 8/2010 Stroila et al.
2010/0217538 A1 8/2010 Safai et al.
2010/0242124 A1 9/2010 Glimcher et al.
2010/0244700 A1 9/2010 Chong et al.
2010/0253489 A1 10/2010 Cui et al.
2010/0261488 A1 10/2010 Little et al.
2010/0265522 A1 10/2010 Dalal et al.
2010/0284615 A1 11/2010 Dalal et al.
2010/0288060 A1 11/2010 Ronsick et al.
2010/0291314 A1 11/2010 Kashani-Shirazi
2010/0299106 A1 11/2010 Audoly et al.
2010/0304640 A1 12/2010 Sofman et al.
2010/0308214 A1 12/2010 Wober
2010/0319176 A1 12/2010 Stewart et al.
2011/0005008 A1 1/2011 Schoots et al.
2011/0053098 A1 3/2011 Dickerson
2011/0069189 A1 3/2011 Venkataraman et al.
2011/0074850 A1 3/2011 Walmsley et al.
2011/0090548 A1 4/2011 Mestha et al.
2011/0097691 A1 4/2011 Bornemann et al.
2011/0098029 A1 4/2011 Rhoads et al.
2011/0122261 A1 5/2011 Silverbrook
2011/0148218 A1 6/2011 Rozbicki
2011/0150326 A1 6/2011 Jeong et al.
2011/0159921 A1 6/2011 Davis et al.
2011/0170534 A1 7/2011 York
2011/0211080 A1 9/2011 Silverbrook
2011/0213664 A1 9/2011 Osterhout et al.
2011/0215562 A1 9/2011 Bleikolm et al.
2011/0226161 A1 9/2011 Schumacher et al.
2011/0234621 A1 9/2011 Steenhoek
2011/0292042 A1 12/2011 Vaganov
2011/0310209 A1 12/2011 Silverbrook
2012/0004039 A1 1/2012 Perry et al.
2012/0080106 A1 4/2012 Griebel et al.
2012/0087581 A1 4/2012 Rasmusson et al.
2012/0092342 A1 4/2012 Suzuki et al.
2012/0092367 A1 4/2012 Suzuki et al.
2012/0098845 A1 4/2012 Kirchner et al.
2012/0098937 A1 4/2012 Sajadi et al.
2012/0120425 A1 5/2012 Kamijima
2012/0157587 A1 6/2012 Meyer et al.
2012/0235313 A1 9/2012 Yan et al.
2012/0286700 A1 11/2012 Maxik et al.
2012/0288195 A1 11/2012 Lings et al.
2012/0325727 A1 12/2012 Dionne et al.
2012/0330684 A1 12/2012 Jacobs et al.
2013/0010136 A1 1/2013 Silverbrook
2013/0010150 A1 1/2013 Silverbrook
2013/0015239 A1 1/2013 Silverbrook
2013/0016232 A1 1/2013 Silverbrook
2013/0018641 A1 1/2013 Prisco et al.
2013/0033513 A1 2/2013 Rasmusson et al.
2013/0054151 A1 2/2013 Kermani et al.
2013/0063568 A1 3/2013 Silverbrook
2013/0072303 A1 3/2013 Mineur et al.
2013/0078624 A1 3/2013 Holmes et al.
2013/0079236 A1 3/2013 Holmes
2013/0088728 A1 4/2013 Chen et al.
2013/0108979 A1 5/2013 Daon
2013/0109950 A1 5/2013 Herzog et al.
2013/0123089 A1 5/2013 Johns et al.
2013/0169830 A1 7/2013 Silverbrook
2013/0202157 A1 8/2013 Pershing
2013/0215439 A1 8/2013 Mcdowell et al.
2013/0219263 A1 8/2013 Abrahami
2013/0225763 A1 8/2013 Pai-Paranjape et al.
2013/0235067 A1 9/2013 Cherna et al.
2013/0278076 A1 10/2013 Proud
2013/0320276 A1 12/2013 Farrell
2013/0327917 A1 12/2013 Steiner et al.
2013/0344296 A1 12/2013 Sharygin et al.
2014/0027952 A1 1/2014 Fan et al.
2014/0068797 A1 3/2014 Doudna et al.
2014/0080556 A1 3/2014 Knutsson
2014/0082854 A1 3/2014 Landa et al.

(56) References Cited

U.S. PATENT DOCUMENTS

2014/0113237 A1 4/2014 Rohner et al.
2014/0123871 A1 5/2014 Dehmel
2014/0168712 A1 6/2014 Smith
2014/0195468 A1 7/2014 Mohammadi et al.
2014/0231625 A1 8/2014 Chang et al.
2014/0242271 A1 8/2014 Prakash et al.
2014/0253610 A1 9/2014 Alman et al.
2014/0272240 A1 9/2014 Planche
2014/0274658 A1 9/2014 Sherwood et al.
2014/0277699 A1 9/2014 Moix et al.
2014/0291886 A1 10/2014 Mark et al.
2014/0296089 A1 10/2014 Holmes et al.
2014/0308661 A1 10/2014 Holmes et al.
2014/0313303 A1 10/2014 Davis et al.
2014/0327761 A1 11/2014 Holzl
2014/0327762 A1 11/2014 Holzl
2014/0350867 A1 11/2014 Alspach et al.
2015/0015650 A1 1/2015 Landa et al.
2015/0018748 A1 1/2015 Hode et al.
2015/0047398 A1 2/2015 Gerlings et al.
2015/0048132 A1 2/2015 Stein
2015/0049745 A1 2/2015 Han et al.
2015/0055085 A1 2/2015 Fonte et al.
2015/0070510 A1 3/2015 Mui
2015/0070694 A1 3/2015 Fan et al.
2015/0106723 A1 4/2015 Bertelsen
2015/0125702 A1 5/2015 He et al.
2015/0126463 A1 5/2015 Hsiao et al.
2015/0134300 A1 5/2015 Norris
2015/0134773 A1 5/2015 Salem
2015/0172894 A1 6/2015 Gabel
2015/0211987 A1 7/2015 Burg et al.
2015/0276485 A1 10/2015 Alman
2015/0343673 A1 12/2015 Williams
2015/0348001 A1 12/2015 Van et al.
2015/0352790 A1 12/2015 Hadas
2015/0371417 A1 12/2015 Angelov et al.
2016/0004953 A1 1/2016 Karani et al.
2016/0005187 A1 1/2016 Prakash
2016/0016229 A1 1/2016 Czinger et al.
2016/0019208 A1 1/2016 Thomas et al.
2016/0039006 A1 2/2016 Amstutz et al.
2016/0063862 A1 3/2016 Rosen
2016/0069919 A1 3/2016 Holmes et al.
2016/0082625 A1 3/2016 Luukko et al.
2016/0095942 A1 4/2016 Markovic et al.
2016/0101500 A1 4/2016 Bajaj et al.
2016/0124009 A1 5/2016 Wasson et al.
2016/0128876 A1 5/2016 Chandrasekaran et al.
2016/0136897 A1* 5/2016 Nielsen-Cole ........ B29C 64/393
425/150
2016/0169923 A1 6/2016 Holmes et al.
2016/0206794 A1 7/2016 Makower et al.
2016/0216287 A1 7/2016 Holmes et al.
2016/0223320 A1 8/2016 Holzl
2016/0230000 A1 8/2016 Gu
2016/0255969 A1 9/2016 High et al.
2016/0279021 A1 9/2016 Hyde et al.
2016/0306977 A1 10/2016 Zarakas et al.
2016/0313294 A1 10/2016 Dattilo et al.
2016/0321546 A1 11/2016 Delespierre et al.
2016/0325529 A1 11/2016 Linthout et al.
2016/0346921 A1 12/2016 Orman et al.
2016/0380158 A1 12/2016 Sasaki et al.
2017/0004360 A1 1/2017 Tanaka et al.
2017/0029991 A1 2/2017 Chandrasekaran et al.
2017/0039807 A1 2/2017 Shigeta
2017/0050374 A1 2/2017 Minardi et al.
2017/0059759 A1 3/2017 Ayres et al.
2017/0061563 A1 3/2017 Falkenstern et al.
2017/0074522 A1 3/2017 Cheng
2017/0083762 A1 3/2017 Segalovitz et al.
2017/0098058 A1 4/2017 Mccullough et al.
2017/0136703 A1 5/2017 Hayes et al.
2017/0139417 A1 5/2017 Reiff et al.
2017/0148371 A1 5/2017 Qian
2017/0157844 A1 6/2017 Mandel et al.
2017/0164178 A1 6/2017 Anjum et al.
2017/0173791 A1 6/2017 Dalibard et al.
2017/0176176 A1 6/2017 Boyle et al.
2017/0190118 A1 7/2017 Mire et al.
2017/0237879 A1 8/2017 Kiser et al.
2017/0240169 A1 8/2017 Coulter et al.
2017/0242570 A1 8/2017 Beymore et al.
2017/0243362 A1 8/2017 Neisen
2017/0248514 A1 8/2017 Pavey et al.
2017/0263594 A1 9/2017 Chung et al.
2017/0300856 A1 10/2017 Wilkinson et al.
2017/0308749 A1 10/2017 Tanno
2017/0312981 A1 11/2017 Selbertinger et al.
2017/0354169 A1 12/2017 Van et al.
2018/0018748 A1 1/2018 Petrovic et al.
2018/0024076 A1 1/2018 Efner et al.
2018/0038838 A1 2/2018 Karancsi et al.
2018/0047198 A1 2/2018 Walters
2018/0056635 A1 3/2018 Van et al.
2018/0056940 A1 3/2018 Etonye
2018/0086002 A1 3/2018 Sun et al.
2018/0108057 A1 4/2018 Nguyen
2018/0120435 A1 5/2018 Decker et al.
2018/0121864 A1 5/2018 Sullivan et al.
2018/0122061 A1 5/2018 Chatterjee et al.
2018/0156663 A1 6/2018 Farley et al.
2018/0156775 A1 6/2018 Chou et al.
2018/0158123 A1 6/2018 Caruso et al.
2018/0158124 A1 6/2018 Caruso et al.
2018/0162013 A1 6/2018 Fulop et al.
2018/0215546 A1 8/2018 High et al.
2018/0218582 A1 8/2018 Hodge et al.
2018/0293734 A1 10/2018 Lim et al.
2018/0305738 A1 10/2018 Kennedy et al.
2018/0308248 A1 10/2018 Hubert et al.
2018/0318865 A1 11/2018 Harvison et al.
2018/0339397 A1* 11/2018 Redfield ............... B29C 64/129
2018/0359901 A1 12/2018 Millar
2019/0001557 A1* 1/2019 Smith, III .............. B33Y 10/00
2019/0016048 A1 1/2019 Parietti et al.
2019/0033491 A1 1/2019 Lu et al.
2019/0070887 A1 3/2019 Peters et al.
2019/0078274 A1 3/2019 Mcneeely
2019/0078936 A1 3/2019 Bischoff et al.
2019/0084222 A1* 3/2019 Jones ...................... B22F 12/45
2019/0086410 A1 3/2019 Wright et al.
2019/0111424 A1 4/2019 Chou et al.
2019/0152149 A1 5/2019 Arayama
2019/0168446 A1 6/2019 Leibig et al.
2019/0200844 A1 7/2019 Shelton et al.
2019/0212256 A1 7/2019 Joch et al.
2019/0276364 A1 9/2019 Liard et al.
2019/0301083 A1 10/2019 Mor et al.
2019/0322039 A1 10/2019 Bursch et al.
2019/0328517 A1 10/2019 Prawel
2019/0351620 A1 11/2019 Jaiswal et al.
2019/0382606 A1 12/2019 Iraqi et al.
2020/0025988 A1 1/2020 Lee et al.
2020/0064194 A1 2/2020 Dauga et al.
2020/0088581 A1 3/2020 Steenhoek et al.
2020/0089991 A1 3/2020 Steenhoek et al.
2020/0101783 A1 4/2020 Jancart et al.
2020/0111201 A1 4/2020 Kuruvilla et al.
2020/0147954 A1 5/2020 Efner et al.
2020/0264773 A1 8/2020 Kim et al.
2020/0342630 A1 10/2020 Elmoznino et al.
2020/0359550 A1 11/2020 Tran et al.
2021/0395879 A1 12/2021 Zhang et al.
2023/0234279 A1 7/2023 Kutchko et al.

FOREIGN PATENT DOCUMENTS

AU 2002317629 B2 4/2005
AU 2002317630 B2 5/2005
AU 2005202921 A1 7/2005
AU 2006225219 A1 10/2006
AU 2009308956 A1 5/2010

(56) References Cited

FOREIGN PATENT DOCUMENTS

| | | | |
|---|---|---|---|
| AU | 2013200172 | A1 | 7/2014 |
| AU | 2014210627 | A1 | 2/2016 |
| BR | PI0617941 | A2 | 3/2010 |
| CA | 2645429 | A1 | 5/2009 |
| CA | 2670049 | A1 | 11/2009 |
| CN | 101296957 | A | 10/2008 |
| CN | 104552951 | A | 4/2015 |
| CN | 106103054 | A | 11/2016 |
| CN | 205951285 | U | 2/2017 |
| CN | 107194081 | A1 | 9/2017 |
| CN | 107556706 | A | 1/2018 |
| CN | 107944107 | A1 | 4/2018 |
| CN | 108875792 | A | 11/2018 |
| CN | 109173827 | A | 1/2019 |
| CN | 109596104 | A | 4/2019 |
| CN | 111087750 | A | 5/2020 |
| CN | 111778477 | A | 10/2020 |
| DE | 102010020039 | A1 | 11/2011 |
| DE | 202013002764 | U1 | 5/2013 |
| DE | 202012011582 | U1 | 12/2013 |
| DE | 102014010239 | A1 | 1/2016 |
| DE | 102019110181 | A1 | 10/2020 |
| EP | 0388932 | A2 | 9/1990 |
| EP | 0833165 | A2 | 4/1998 |
| EP | 1021794 | A1 | 7/2000 |
| EP | 1152085 | A1 | 11/2001 |
| EP | 1224524 | A1 | 7/2002 |
| EP | 1425175 | A1 | 6/2004 |
| EP | 1425180 | A2 | 6/2004 |
| EP | 1615010 | A1 | 1/2006 |
| EP | 1925751 | A1 | 5/2008 |
| EP | 2074158 | A1 | 7/2009 |
| EP | 2444440 | A2 | 4/2012 |
| EP | 2600333 | A2 | 6/2013 |
| EP | 3155560 | A1 | 4/2017 |
| ES | 2362069 | A1 | 6/2011 |
| ES | 1144959 | U | 10/2015 |
| ES | 2735284 | A1 | 12/2019 |
| ES | 1253300 | U | 10/2020 |
| GB | 1294536 | A | 11/1972 |
| GB | 2575056 | A | 1/2020 |
| JP | 48-055513 | A | 8/1973 |
| JP | 49-024242 | A | 3/1974 |
| JP | 02-292699 | A | 12/1990 |
| JP | 09-236933 | A | 9/1997 |
| JP | 09-249000 | A | 9/1997 |
| JP | 2001-174333 | A | 6/2001 |
| JP | 2002-351887 | A | 12/2002 |
| JP | 2003-006197 | A | 1/2003 |
| JP | 2003-034762 | A | 2/2003 |
| JP | 2004-224966 | A | 8/2004 |
| JP | 2005-098980 | A | 4/2005 |
| JP | 2005-206734 | A | 8/2005 |
| JP | 2006-213854 | A | 8/2006 |
| JP | 2008-170155 | A | 7/2008 |
| JP | 2020-042000 | A | 3/2020 |
| JP | 6703639 | B1 | 6/2020 |
| KR | 10-1410122 | B1 | 6/2014 |
| KR | 10-2015-0096966 | A | 8/2015 |
| MX | 02004129 | A | 4/2004 |
| MX | 2010008501 | A | 2/2012 |
| PT | 109559 | A | 1/2018 |
| TW | 201333188 | A | 8/2013 |
| WO | 99/04368 | A1 | 1/1999 |
| WO | 00/01835 | A2 | 1/2000 |
| WO | 2000/037362 | A1 | 6/2000 |
| WO | 00/72126 | A1 | 11/2000 |
| WO | 02/69038 | A2 | 9/2002 |
| WO | 03/13858 | A1 | 2/2003 |
| WO | 03/13862 | A1 | 2/2003 |
| WO | 03/13869 | A2 | 2/2003 |
| WO | 2004/096400 | A2 | 11/2004 |
| WO | 2004/102134 | A2 | 11/2004 |
| WO | 2005/029766 | A2 | 3/2005 |
| WO | 2005/097876 | A1 | 10/2005 |
| WO | 2005/120835 | A1 | 12/2005 |
| WO | 2006/052556 | A2 | 5/2006 |
| WO | 2006/052561 | A2 | 5/2006 |
| WO | 2006091842 | A1 | 8/2006 |
| WO | 2007/139653 | A1 | 12/2007 |
| WO | 2008/051320 | A1 | 5/2008 |
| WO | 2008/051321 | A1 | 5/2008 |
| WO | 2011/048147 | A1 | 4/2011 |
| WO | 2013/043203 | A2 | 3/2013 |
| WO | 2013/052318 | A1 | 4/2013 |
| WO | 2014/127379 | A1 | 8/2014 |
| WO | 2014/135467 | A1 | 9/2014 |
| WO | 2015/023551 | A1 | 2/2015 |
| WO | 2015/081313 | A2 | 6/2015 |
| WO | 2015/084139 | A1 | 6/2015 |
| WO | 2015/192117 | A1 | 12/2015 |
| WO | 2016/019176 | A1 | 2/2016 |
| WO | 2016/026856 | A1 | 2/2016 |
| WO | 2018/041727 | A1 | 3/2018 |
| WO | 2018/070428 | A1 | 4/2018 |
| WO | 2018/181745 | A1 | 10/2018 |
| WO | 2019/113364 | A1 | 6/2019 |
| WO | 2019/117723 | A1 | 6/2019 |
| WO | 2019/183359 | A1 | 9/2019 |
| WO | 2019/197956 | A1 | 10/2019 |
| WO | 2019/224097 | A1 | 11/2019 |
| WO | 2019/224100 | A1 | 11/2019 |
| WO | 2020/001835 | A1 | 1/2020 |
| WO | 2020/049860 | A1 | 3/2020 |
| WO | 2020/057458 | A1 | 3/2020 |
| WO | 2020/057464 | A1 | 3/2020 |
| WO | 2020/077449 | A1 | 4/2020 |
| WO | 2020/096626 | A1 | 5/2020 |
| WO | 2020/120681 | A1 | 6/2020 |
| WO | 2020/123443 | A1 | 6/2020 |
| WO | 2020/125839 | A1 | 6/2020 |
| WO | 2020/142433 | A1 | 7/2020 |
| WO | 2020/154397 | A1 | 7/2020 |
| WO | 2020/157244 | A1 | 8/2020 |
| WO | 2020/169678 | A1 | 8/2020 |
| WO | 2020/173696 | A1 | 9/2020 |
| WO | 2020/178718 | A1 | 9/2020 |
| WO | 2020/180425 | A1 | 9/2020 |
| WO | 2020/200982 | A1 | 10/2020 |
| WO | 2021/237016 | A1 | 11/2021 |
| WO | 2021/252477 | A1 | 12/2021 |
| WO | 2022/233580 | A1 | 11/2022 |
| ZA | 200707884 | | 12/2008 |

OTHER PUBLICATIONS

Office Action received for European Patent Application No. 21782610, mailed on Apr. 16, 2024, 5 pages.

Requirement for Restriction/Election received for U.S. Appl. No. 18/003,709, mailed on Aug. 15, 2024, 9 pages.

International Search Report and Written Opinion received for PCT Application Serial No. PCT/US2021/030455 dated Dec. 3, 2021, 11 pages.

Linhares et al., "Color diversity index: The effect of chromatic adaptation", Proc. of SPIE vol. 8001 800104-1, May 2011, 9 Pages.

Radu Metz, "Method for the Determination of Tolerance and for the Improvement of Agreement Between Color Differences Assessed Visually and with the Delta E", Federation d'Associations de Techniciens des Industries des Peintures, Vernis, Em (1982), vol. 2, pp. 257-270.

"Color & Appearance", Retrieved from https://web.archive.org/web/20021202225811/http://www.xrite.com/helpdesk/DocList_01.asp?Market=6, Mar. 2, 2020, 12 Pages.

Huang et al., "Environment-friendly pigments based on praseodymium and terbium doped La2Ce2O7 with high near-infrared reflectance: Synthesis and characterization", Dyes and Pigments, vol. 147, Dec. 2017, pp. 225-233.

Herrera et al., "Weathering resistance of thermally modified wood finished with coatings of diverse formulations", Progress in Organic Coatings vol. 119, Jun. 2018, pp. 145-154.

Choudhary, "Principles of Colour and Appearance Measurement vol. 2: Visual Measurement of Colour, Colour Comparison and Management", pp. 55-116, 2015.

(56) References Cited

OTHER PUBLICATIONS

Phukpattaranont et al., "Computer-aided analysis of nuclear stained breast cancer cell images", 2008 5th International Conference on Electrical Engineering/Electronics, Computer, Telecommunications and Information Technology, 2008.
Verma G., "Weathering, salt spray corrosion and mar resistance mechanism of clay (nano-platelet) reinforced polyurethane nanocomposite coatings", Progress in Organic Coatings, vol. 129, Apr. 2019, pp. 260-270.
Medina et al., "Fluctuation scaling of color variability in automotive metallic add-on parts", Progress in Organic Coatings, vol. 104, Mar. 2017, pp. 118-124.
Berezhnoy et al., "Computer analysis of Van Gogh's complementary colours", Pattern Recognition Letters, vol. 28, Issue 6, Apr. 15, 2007, pp. 703-709.
"Best Car Customisation Games", Retrieved from https://www.allcarleasing.co.uk/blog/best-car-customization-games/, Mar. 28, 2019, 10 Pages.
"AkzoNobel Introduces Connect API to Share Collision Repair Shop Data with Third Party Software", Retrieved from https://collisionweek.com/2020/10/13/akzonobel-introduces-connect-api-share-collision-repair-shop-data-third-party-software/, Oct. 13, 2020, 6 Pages.
"SEM's QR Codes Make Life Easier for Technicians", Retrieved from https://www.semproducts.com/blog/sems-qr-codes-make-life-easier-for-technicians, Oct. 2, 2020, 5 pages.
Gupta et al., "Wood coating failures against natural and accelerated climates", Construction Materials, vol. 168(1), Feb. 2015, pp. 3-15.
"Color tools", Yatu paint, Retrieved from https://global.yatupaint.com/color-tools/, Retrieved on Oct. 4, 2022, 1 Page.
Moreno et al., "Car Visualizer", Retrieved from https://experiments.withgoogle.com/car-visualizer, Retrieved on Oct. 3, 2022, 3 Pages.
Shamey et al., "Performance of various color difference models in challenging regions of CIELAB color space", Society for Imaging Science and Technology, 2014, 7 Pages.
Hollman et al., "Colours a la carte", European Coatings Journal, Jan. 2009.
"Color Finder", Retrieved on https://www.sw-rodandrestocustomcolor.com/find-your-color, Retrieved on Oct. 3, 2022, 11 Pages.
Westlund et al., "Applying Appearance Standards to Light Reflection Models", Department of Computer and Information Science, University of Oregon, Aug. 12-17, 2001, pp. 501-510.
Komatsubara et al., "Visual color matching under various viewing conditions", Dec. 2002Color Research & Application, vol. 27, No. 6, pp. 399-420.
"Carwrapper", Retrieved from https://www.carwrapper.com/, Retrieved on Retrieved on Oct. 3, 2022, 11 Pages.
Nascimento et al., "Estimating the colors of paintings", International Workshop on Computational Color Imaging, 2015, pp. 236-242.
Lee et al., "Hue-shift modeling and correction method for high-luminance display", 2007 IEEE International Conference on Image Processing, 2007, pp. 465-468.
Shimizu, C., et al., "Interactive Goniochromatic Color Design," DBLP, The Eleventh Color Imaging Conference: Color Science and Engineering Systems, Technologies, Jan. 2003, pp. 7.
Lew et al., "Structure-property of pigmented polypropylene nanocomposites incorporating organo-layered silicates", Society of Plastics Engineers, Proceedings of the 4th European Additives and Colors Conference 2005 (2005), vol. 2005, 7 p.
Pinto et al., "Illuminant spectrum maximizing the number of perceived colors in art paintings", CGIV 2008 and MCS'08 Final Program and Proceedings, 2008, pp. 505-507.
Berns et al., "The science of digitizing paintings for color-accurate image archives: A review", Journal of Imaging Science and Technology, vol. 45, No. 4, 2001, 21 Pages.
Imai et al., "Color image correction of art paintings based on artists' color features and illuminant conversion", Journal of Light & Visual Environment 37(2_3), pp. 114-125.
"Metallix Master v1.80", Retrieved from https://web.archive.org/web/20020902004912/http://www.xrite.com/helpdesk/DocDetail.ASP?DocNr=613, Mar. 2, 2020, 1 Page.
Snyders et al., "The upgrading of an inferior grade zircon to superior pacifier for sanitary ware and glazes", Aug. 2005, Journal—South African Institute of Mining and Metallurgy 105(7): pp. 459-463.
Saeedi et al., "How anisotropy of CIELAB color space affects the separation effect: An experimental study", Journal of the Optical Society of America A vol. 36, Issue 1, pp. 51-60 (2019).
"Anatomy of an ARC Swatch—Arc", Retrieved on http://arcswatch.com/index.php/anatomy-of-an-arc-swatch/, Retrieved on Oct. 3, 2022, 4 Pages.
"Carbeat", Retrieved from https://www.carbeat.com/, Retrieved on Oct. 3, 2022, 8 Pages.
"BMW Individual Manufaktur Visualizer", Retrieved from https://visualizer.bmw-individual.com/Ipps/bmwoac?page=imc&market=80001-DE&dc=1-1&header=1&qrcode=1&pdf=1&lang=EN#top, Retrieved on Oct. 3, 2022, 2 Pages.
"Maaco auto body shop and painting", Retrieved from https://www.maaco.com/press/maaco-app-android/, Retrieved on Oct. 3, 2022, 4 Pages.
Malm et al., "Influence of rheology modifiers and coating parameters on the color-changing effects of textile coatings with multi-layered mica pigments", vol. 85, Issue 9, 2014, pp. 936-948.
Carlton Jr. "Matching the optical properties of direct esthetic dental restorative materials to those of human enamel and dentin", 1998, vol. 59-05, Section: B, p. 2100.; 194 p.
Ziljak et al., "Managing dual color properties with the Z-parameter in the visual and NIR spectrum", Infrared Physics & Technology, vol. 55, Issue 4, Jul. 2012, pp. 326-336.
Janesch et al., "Transparent layer-by-layer coatings based on biopolymers and CeO2 to protect wood from UV light", Progress in Organic Coatings, vol. 138, Jan. 2020, 105409.
"Car Wrap Visualizer", Retrieved on https://graphics.averydennison.com/en/home/resources-and-learning/carvisualizer.html, Retrieved on Oct. 3, 2022, 3 Pages.
Junqueira-Goncalves et al., "Post-consumer Recycled PET Packaging for Fresh Berries: A Comparative Study between Incorporating an Antifungal Agent Superficially and into the Main Body of the Packaging", Food and Bioprocess Technology vol. 7, pp. 2610-2617 (2014).
Mohammadalizadeh et al., "Modelling the orange-peel texture for chromatic and achromatic samples", Progress in Organic Coatings, vol. 135, Oct. 2019, pp. 148-155,.
Murillo et al., "Color evolution during a coating process of pharmaceutical tablet cores by random spraying", 2018, 8 Pages.
Vazquez et al., Study of chromatic variations between metameres by varying the lighting in the painting "Boy in a turban holding a nosegay" by Michiel Sweerts, Dec. 2012Proceedings of SPIE—The International Society for Optical Engineering, vol. 8550 855035-1.
Arredondo et al., "Multilevel color transfer on images for providing an artistic sight of the world", IEEE Access, vol. 5, 2017, pp. 15390-15399.
Sanchez et al., "Testing Color-Mixing Laws in Soil Mineral Mixtures", European Conference on Colour in Graphics, Imaging and Vision (CGIV), (2002), pp. 202-205, 644 p.
Mohammadalizadeh et al., "Effect of color on some geometric attributes of visual appearance of non-effect coatings", Journal of Coatings Technology and Research, 2020, vol. 17, pp. 949-961.
Kim. D.B. et al., "Computer-aided appearance design based on BRDF measurements," Computer-Aided Design, 2011, vol. 43, pp. 1181-1193.
"Freebie: Advanced car paint OSL shader," Retrieved from https://cg-lion.com/2020/07/25/freebie-advanced-car-paint-psl-shader/, Jul. 25, 2020, pp. 8.
"CGL Car Paint Presets Pack 1.0," Retrieved from https://www.youtube.com/watch?v=Li5n52R9FQU, Retrieved on Dec. 20, 2022, pp. 3.
SEM's QR Codes Make Life Easier for Technicians, (Oct. 2, 2020), 4 pages.
Yatu, Professional Refinish Color Tools, available online at <https://global.yatupaint.com/color-tools/>, 1 page.

(56) References Cited

OTHER PUBLICATIONS

CollisionWeek, AkzoNobel Introduces Connect API to Share CoL-Lision Repair Shop Data with Third Party Software, (Oct. 13, 2020), 4 pages.
"Market Place Novel products," European Coatings Journal, (2015), p. 2.
Anatomy of an ARC Swatch—Arc, avaialble online at <arcswatch.com/index.php/anatonny-of-an-arc-swatch/>, printed on (Dec. 7, 2020), 3 pages.
Innovative Repair And Refinishing Products | SEM Products, available online at <https://www.semproducts.com>, printed on (Dec. 7, 2020), 3 pages.
AkzoNobel, Carbeat in a nutshell, Controlling the pulse of your business, (2017), 2 pages.
Sramcik, T., "Inventory Optimization, Right-Size your Paint Department Supplies with these Expert Tips," vol. 55.12, Dec. 2016, pp. 56-60.
Wang et al., "3D Printing Technology", Huazhong University of Science and Technology Press, May 2014, 6 Pages.

* cited by examiner

SYSTEM FOR RAPID OBJECT PRODUCTION USING FLOW INFILL DESIGN

GOVERNMENT RIGHTS

This invention was made with government support under contract no. W911NF-17-2-0227 awarded by the US ARMY (US Army ACC-APG-RTP W911NF). The government has certain rights in the invention.

BACKGROUND OF THE INVENTION

1. Technical Field

The present invention relates to computer control of three-dimensional printing methods that use coreactive materials.

2. Background and Relevant Art

Three-dimensional (3D) printing, also referred to as additive manufacturing, has experienced a technological explosion in the last several years. This increased interest is related to the ability of 3D printing to easily manufacture a wide variety of objects from common computer-aided design (CAD) files. In 3D printing, a composition is laid down in successive layers of material to build a structure. These layers may be produced, for example, from liquid, powder, paper, or sheet material.

In some conventional configurations, a 3D printing system utilizes a thermoplastic material. The 3D printing system extrudes the thermoplastic material through a heated nozzle on to a platform. Using instructions derived from a CAD file, the system moves the nozzle with respect to the platform, successively building up layers of thermoplastic material to form a 3D object. After being extruded from the nozzle, the thermoplastic material cools. The resulting 3D object is thus made of layers of thermoplastic material that have been extruded in a heated form and layered on top of each other.

BRIEF SUMMARY OF THE INVENTION

The present invention includes a computer system for part production using flow infill design. The computer system comprises one or more processors and one or more computer-readable media having stored thereon executable instructions that when executed by the one or more processors configure the computer system to perform various acts. The computer system receives a computer-aided design (CAD) file that describes physical dimensions of a target object. The computer system also identifies a physical boundary portion of the target object within the CAD file. The physical boundary portion comprises a portion of the target object that is configured to enclose a coreactive infill material. Additionally, the computer system generates a first tool path to additively manufacture the physical boundary portion. Further, the computer system sends instructions to a computer system in communication with a dispenser that cause the dispenser to implement the first tool path while dispensing a boundary material. Further still, the computer system generates a command to dispense the coreactive infill material within the physical boundary portion.

Additionally, the present invention includes a method for part production using flow infill design. The method comprises receiving a computer-aided design (CAD) file that describes physical dimensions of a target object. The method also comprises identifying a physical boundary portion of the target object within the CAD file, wherein the physical boundary portion comprises a portion of the target object that is configured to enclose a coreactive infill material. Additionally, the method comprises generating a first tool path to additively manufacture the physical boundary portion. Further, the method comprises sending instructions to a computer system in communication with a dispenser that cause the dispenser to implement the first tool path while dispensing a boundary material. Further still, the method comprises generating a command to dispense the coreactive infill material within the physical boundary portion.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims and clauses. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific examples thereof, which are illustrated in the appended drawings. Understanding that these drawings depict only typical examples of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
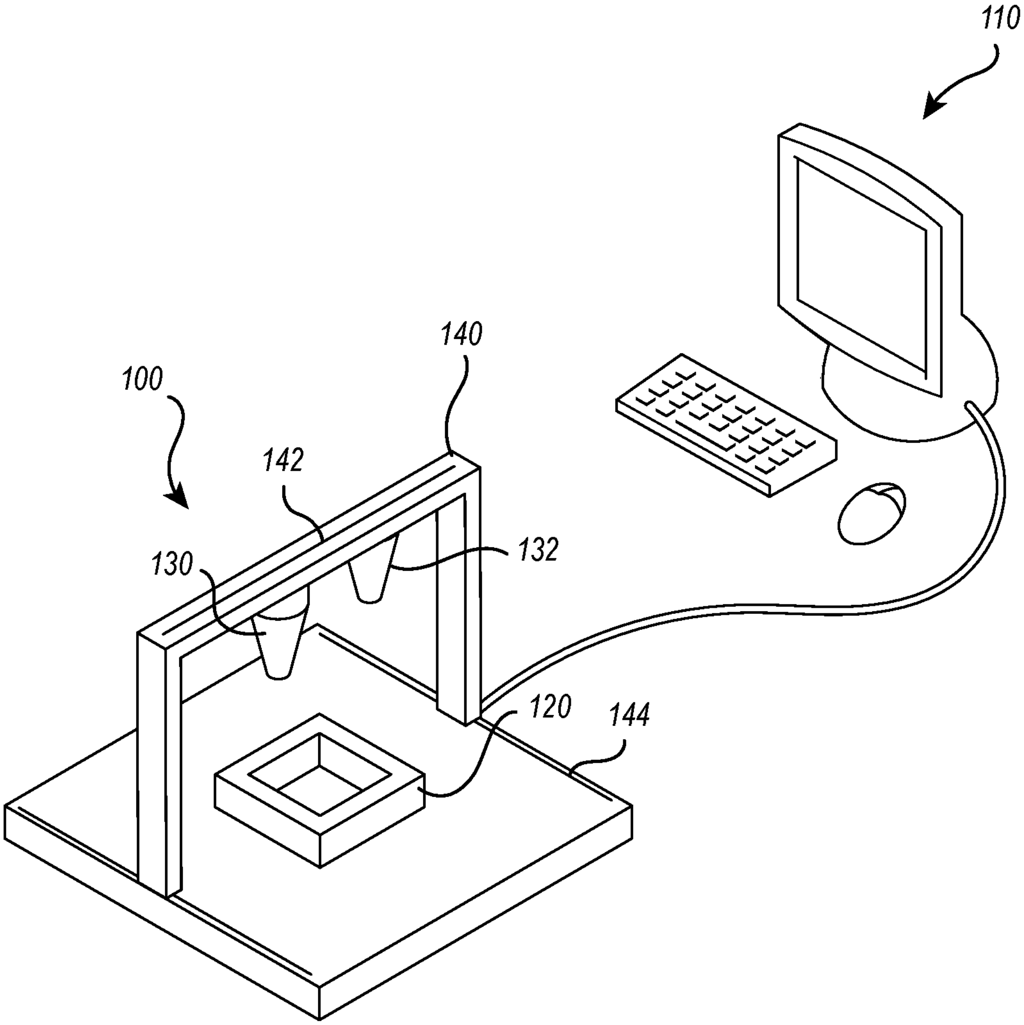
FIG. 1 illustrates a system for rapid object production using flow infill design.

The present invention extends to systems, methods, and apparatuses for rapid object production using flow infill design. The systems, methods, and apparatuses operate through the deposition of coreactive materials as infill during the creation of a target object. As used here, a "target object" may refer to a portion of a physical object or a complete physical object that is being, at least in part, additively manufactured by the systems, method, and/or apparatuses described here. Additionally, as used herein coreactive materials include thermoset materials.

Additive manufacturing using coreactive components has several advantages compared to alternative additive manufacturing methods. As used herein, "additive manufacturing" refers to the use of computer-aided design (through user generated files or 3D object scanners) to cause an additive manufacturing apparatus to deposit material, layer upon layer, in precise geometric shapes. Additive manufacturing using coreactive components can create stronger parts because the materials forming successive layers can be coreacted to form covalent bonds between the layers. Also, because the components have a low viscosity when mixed, higher filler content can be used. The higher filler content can be used to modify the mechanical and/or electrical properties of the materials and the built object. Coreactive components can extend the chemistries used in additively manufactured parts to provide improved properties such as solvent resistance and thermal resistance.

Additionally, the ability to use a computer system to control the use of coreactive components within an additive manufacturing environment provides several advantages. For example, the computer system is able to dynamically control and adjust the flow rates and tool paths of the coreactive components in ways that produce desired physical attributes of the resulting material. Such adjustments and control provide unique advantages within additive manufacturing.

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The use of the singular includes the plural and plural encompasses singular, unless specifically stated otherwise. In addition, the use of "or" means "and/or" unless specifically stated otherwise, even though "and/or" may be explicitly used in certain instances.

The term "polymer" is meant to include prepolymer, homopolymer, copolymer, and oligomer.

Embodiments of the present disclosure are directed to the production of structural objects using 3D printing. A 3D object may be produced by forming successive portions or layers of an object by depositing at least two coreactive components onto a substrate and thereafter depositing additional portions or layers of the object over the underlying deposited portion or layer. Layers are successively deposited to build the 3D printed object. The coreactive components can be mixed and then deposited or can be deposited separately. When deposited separately, the components can be deposited simultaneously, sequentially, or both simultaneously and sequentially.

Deposition and similar terms refer to the application of a printing material comprising a coreactiveting or coreactive composition and/or its reactive components onto a substrate (for a first portion of the object) or onto previously deposited portions or layers of the object. Each coreactive component may include monomers, prepolymers, adducts, polymers, and/or crosslinking agents, which can chemically react with the constituents of the other coreactive component.

The at least two coreactive components may be mixed together and subsequently deposited as a mixture of coreactive components that react to form portions of the object. For example, the two coreactive components may be mixed together and deposited as a mixture of coreactive components that react to form the coreactiveting composition by delivery of at least two separate streams of the coreactive components into a mixing apparatus such as a static mixer to produce a single stream that is then deposited. The coreactive components may be at least partially reacted by the time a composition comprising the reaction mixture is deposited. The deposited reaction mixture may react at least in part after deposition and may also react with previously deposited portions and/or subsequently deposited portions of the object such as underlying layers or overlying layers of the object.

Alternatively, the two coreactive components may be deposited separately from each other to react upon deposition to form the portions of the object. For example, the two coreactive components may be deposited separately such as by using an inkjet printing system whereby the coreactive components are deposited overlying each other and/or adjacent to each other in sufficient proximity so the two reactive components may react to form the portions of the object. As another example, in an extrusion, rather than being homogeneous, a cross-sectional profile of the extrusion may be inhomogeneous such that different portions of the cross-sectional profile may have one of the two coreactive components and/or may contain a mixture of the two coreactive components in a different molar and/or equivalents ratio.

Furthermore, throughout a 3D-printed object, different parts of the object may be formed using different proportions of the two coreactive components such that different parts of an object may be characterized by different material properties. For example, some parts of an object may be rigid and other parts of an object may be flexible.

It will be appreciated that the viscosity, reaction rate, and other properties of the coreactive components may be adjusted to control the flow of the coreactive components and/or the coreactiveting compositions such that the deposited portions and/or the object achieves and retains a desired structural integrity following deposition. The viscosity of the coreactive components may be adjusted by the inclusion of a solvent, or the coreactive components may be substantially free of a solvent or completely free of a solvent. The viscosity of the coreactive components may be adjusted by the inclusion of a filler, or the coreactive components may be substantially free of a filler or completely free of a filler. The viscosity of the coreactive components may be adjusted by using components having lower or higher molecular weight. For example, a coreactive component may comprise a prepolymer, a monomer, or a combination of a prepolymer and a monomer. The viscosity of the coreactive components may be adjusted by changing the deposition temperature. The coreactive components may have a viscosity and temperature profile that may be adjusted for the particular deposition method used, such as mixing prior to deposition and/or ink jetting. The viscosity may be affected by the composition of the coreactive components themselves and/or may be controlled by the inclusion of rheology modifiers as described herein.

It can be desirable that the viscosity and/or the reaction rate be such that following deposition of the coreactive components the composition retains an intended shape. For example, if the viscosity is too low and/or the reaction rate is too slow a deposited composition may flow in a way that compromises the desired shape of the finished object. Similarly, if the viscosity is too high and/or the reaction rate is too fast, the desired shape may be compromised.

Turning now to the figures, FIG. 1 illustrates a system for rapid object production using flow infill design. The depicted system comprises a 3D printer 100 in communication with a computer system 110. While depicted as a physically separate component, the computer system 110 may also be wholly integrated within the 3D printer 100, distributed between multiple different electronic devices (including a cloud computing environment), or otherwise integrated with the 3D printer 100. As used herein, a "3D printer" refers to any device capable of additive manufacture using computer-generated data files. Such computer-generated data files herein are referred to as "CAD files."

The 3D printer 100 is depicted with a target object 120 in the form of a block. The block comprises a square shaped outline that is constructed by the 3D printer 100 using, at least in part, coreactive components. The 3D printer 100 comprises a dispenser 130 that is attached to a movement mechanism 140. As used herein, a "dispenser" may comprise a dynamic nozzle, a static nozzle, injection device, a pouring device, a dispensing device, an extrusion device, a sprayer device, or any other device capable of providing a controlled flow of coreactive components. Additionally, the movement mechanism 140 is depicted as comprising the dispenser 130 attached within a track 142 that is moveable in an X-axis direction along an arm and another set of tracks 144 in which the arm is able to move in a Y-axis direction. One will appreciate, however, that this configuration is provided only for the sake of example and explanation. In additional or alternative configurations, the movement mechanism 140 may comprise any system that is capable of controlling a position of the dispenser 130 with respect to a target object 120, including, but not limited to a system that causes the target object 120 to move with respect to the dispenser 130.

As depicted, in some configurations, the 3D printer 100 comprises multiple dispensers 130, 132. The multiple dispensers may be used interchangeably or may comprise unique attributes and uses. For example, dispenser 130 may be utilized for additive manufacturing using coreactive components within a material, while dispenser 132 may be used for flowing coreactive infill materials into the target object 120. Possible combined usages of these different dispensers 130, 132 will be described in greater detail below.

Figure 2:
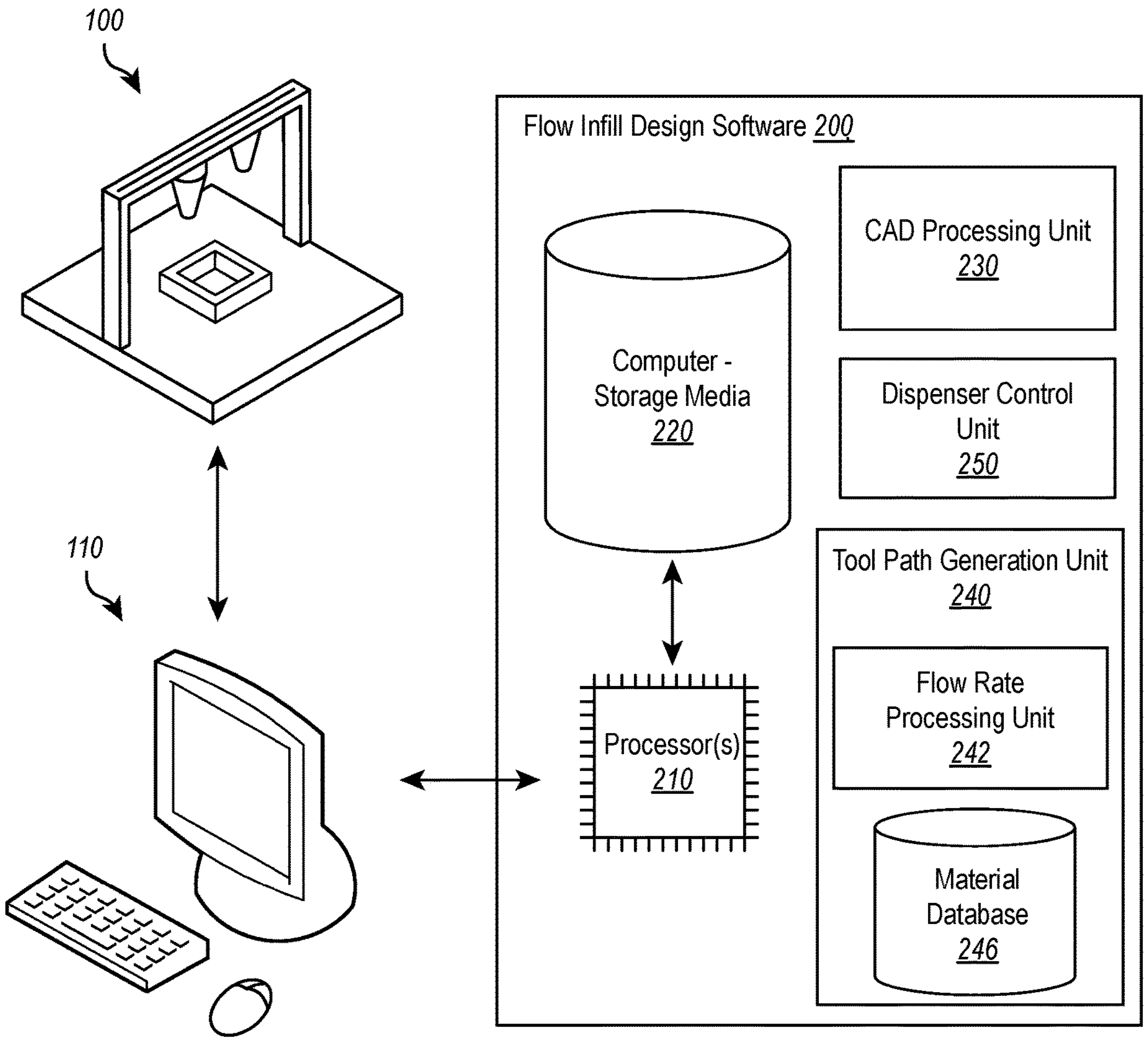
FIG. 2 illustrates a schematic of a computer system for rapid object production using flow infill design.

FIG. 2 illustrates a schematic of a computer system 110 for rapid object production using flow infill design. The computer system 110 is shown as being in communication with a 3D printer 100. Additionally, various modules, or units, of a flow infill design software 200 are depicted as being executed by the computer system 110. In particular, the flow infill design software 200 is depicted as comprising a CAD processing unit 230, a tool path generation unit 240, a flow rate processing unit 242, a material database 246, and a dispenser control unit 250.

As used herein, a "module" comprises computer executable code and/or computer hardware that performs a particular function. One of skill in the art will appreciate that the distinction between different modules is at least in part arbitrary and that modules may be otherwise combined and divided and still remain within the scope of the present disclosure. As such, the description of a component as being a "module" is provided only for the sake of clarity and explanation and should not be interpreted to indicate that any particular structure of computer executable code and/or computer hardware is required, unless expressly stated otherwise. In this description, the terms "unit", "component", "agent", "manager", "service", "engine", "virtual machine" or the like may also similarly be used.

The computer system 110 also comprises one or more processors 210 and one or more computer-storage media 220 having stored thereon executable instructions that when executed by the one or more processors 210 configure the computer system 110 to perform various acts. For example, the computer system 110 is configured to receive a computer-aided design (CAD) file that describes physical dimensions of a target object 120. In the depicted example, the CAD processing unit 230 reads the CAD file and identifies physical dimensions for a block. The CAD file may also comprise instructions relating to the type of material and/or desired characteristics of the material that is to be used to create the block.

Figure 3A:
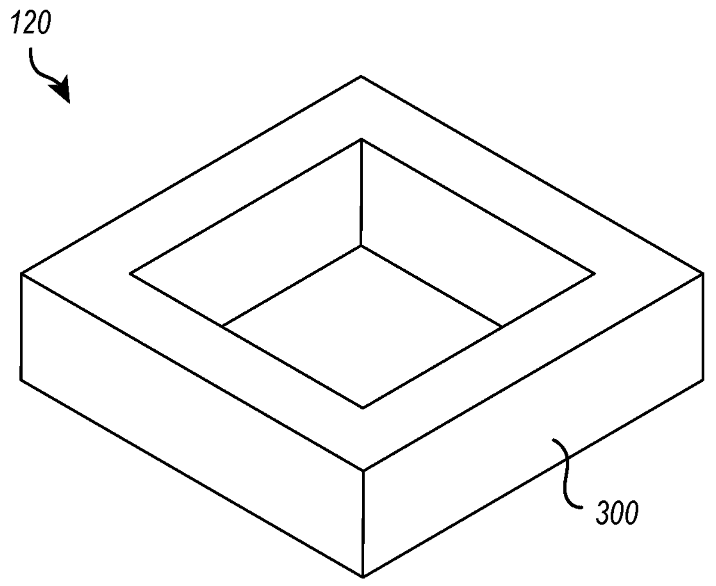
FIG. 3A illustrates a physical boundary portion of the example target object for manufacture.
Figure 3B:
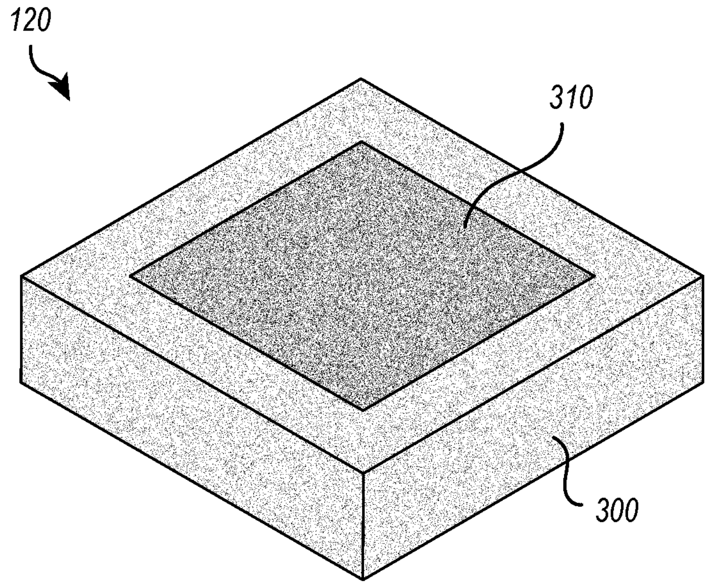
FIG. 3B illustrates the example target object for manufacture from FIG. 3A.

The computer system 110 is also configured to identify a physical boundary portion of the target object 120 within the CAD file. As used herein, the "physical boundary portion" comprises a portion of the target object that encloses coreactive infill material. As used herein, "coreactive infill material" comprises any material that is flowed into a physical boundary portion of the target object 120. Additionally, as used herein, "flow" or "flowed" refers to the physical deposit of the coreactive infill material into the target object 120. For example, FIG. 3A illustrates a physical boundary portion 300 of the example target object 120 for manufacture. FIG. 3B illustrates the example target object 120 for manufacture with the coreactive infill material 310 deposited within the physical boundary portion 300. In the depicted example, the physical boundary portion 300 comprises the outer edges of the block. In some examples, however, a physical boundary portion 300 may not necessarily comprise the outermost edges of the target object 120. For instance, a target object 120 may comprise multiple physical boundary portions that each define a different area that encloses coreactive infill material 310.

In the depicted example, the physical boundary portion 300 may comprise a coreactive material, a thermoplastic material, or any other material capable of additive manufacturing with a 3D printer 100. The same 3D printer 100 may be used for both the creation of the physical boundary portion 300 and the dispensing of the infill within the physical boundary portion 300. In such a case, the CAD processing unit 230 may already be aware of the identity and relative location of the physical boundary portion 300 within the 3D printer 100 because the 3D printer itself created the physical boundary portion 300.

Once CAD processing unit 230 has identified the physical boundary portion 300, the tool path generation unit 240 generates a first tool path to additively manufacture the physical boundary portion 300. As used herein, a "tool path" refers to the path and speed of the dispenser 130 as it manufactures the target object 120. The tool path generation unit 240 generates the first tool path such that the coreactive material is dispensed from the dispenser 130 at a rate and along a path that will create the physical boundary portion 300.

In some circumstances, the first tool path may require the dispenser 130 to layer coreactive material in layers on top of itself. The flow rate processing unit 242 and dispenser control unit 250 calculate a target flowrate to ensure that the coreactive material properly bonds between the different layers. Such calculations may account for the reactive time of the coreactive material such that the layers are placed on top of each other before lower layers have time to fully cure. As such, the generation of the first tool path may be based, at least in part, upon the target flow rate. As explained above, such information relating to the amount of time that different coreactive components remain reactive is provided by the material database 246.

The flow rate processing unit 242 may calculate a target flow rate to create the physical boundary portion 300 with the coreactive material. As used herein, the "flow rate" comprises the rate at which one or more components of the material are dispensed from a dispenser 130, 132. The flow rate may be controllable on a per-component basis. For example, the tool path generation unit 240 comprises a flow rate processing unit 242 that determines and controls the target flow rate for dispensing coreactive material to create the physical boundary portion 300 and to dispense infill coreactive material within the physical boundary portion 300.

The flow rate processing unit 242 may be configured to manipulate the flow rate of the coreactive material by changing properties of the coreactive components within the coreactive material for the physical boundary portion 300 and/or for the infill portion. It will be appreciated that the viscosity, reaction rate, and other properties of the coreactive components may be adjusted to control the flow of the coreactive components and/or the thermosetting compositions such that the deposited portions and/or the object achieves and retains a desired structural integrity following deposition. The viscosity of the coreactive components may be adjusted by the inclusion of a solvent, or the coreactive components may be substantially free of a solvent or completely free of a solvent. The viscosity of the coreactive components may be adjusted by the inclusion of a filler, or the coreactive components may be substantially free of a filler or completely free of a filler. The viscosity of the coreactive components may be adjusted by using components having lower or higher molecular weight. For example, a coreactive component may comprise a prepolymer, a monomer, or a combination of a prepolymer and a monomer. The viscosity of the coreactive components may be adjusted by changing the deposition temperature. The coreactive components may have a viscosity and temperature profile that may be adjusted for the particular deposition method used, such as mixing prior to deposition and/or ink jetting. The viscosity may be affected by the composition of the coreactive components themselves and/or may be controlled by the inclusion of rheology modifiers as described herein.

It can be desirable that the viscosity and/or the reaction rate be such that following deposition of the coreactive components the composition retains an intended shape. For example, if the viscosity is too low and/or the reaction rate is too slow a deposited composition may flow in a way the compromises the desired shape of the finished object. Similarly, if the viscosity is too high and/or the reaction rate is too fast, the desired shape may be compromised.

For example, the coreactive components that are deposited together may each have a viscosity at 25° C. and a shear rate at 0.1 $s^{-1}$ from 5,000 centipoise (cP) to 5,000,000 cP, from 50,000 cP to 4,000,000 cP, or from 200,000 cP to 2,000,000 cP. The coreactive components that are deposited together may each have a viscosity at 25° C. and a shear rate at 1,000 $s^{-1}$ from 50 centipoise (cP) to 50,000 cP, from 100 cP to 20,000 cP, or from 200 to 10,000 cP. Viscosity values can be measured using an Anton Paar MCR 301 or 302 rheometer with a gap from 1 mm to 2 mm.

Depending upon the desired properties, an infill material and a boundary material may comprise different viscosities. For example, a boundary material may comprise a higher viscosity than an infill material, such that the boundary material holds its form, while the infill material easily flows to fill a physical boundary portions defined by the boundary material. For example, an infill material may comprise a viscosity between 800 cP to 1800 cP and a boundary material may comprise a viscosity between 700 cP to 2900 cP. Additionally or alternatively, an infill material may comprise a viscosity between 300 cP to 3000 cP and a boundary material may comprise a viscosity between 500 cP to 5000 cP. Additionally or alternatively, an infill material may comprise a viscosity between 100 cP to 5000 cP and a boundary material may comprise a viscosity between 300 cP to 10000 cP.

Additionally or alternatively, the dispenser control unit 250 may adjust the characteristics of the 3D printer 100 in order to achieve a desired flow rate. For example, the dispenser control unit 250 may cause the dispenser 130 to travel faster or slower in order to achieve the desired deposition rate, viscosity, and/or reaction rate. Similarly, the dispenser control unit 250 may cause the dispenser 130 to dispense the coreactive material at higher or lower rates based upon a desired flow rate. As such, the flow rate processing unit 242 may adjust the properties of the coreactive components within the material and/or the dispenser control unit 250 may adjust the mechanical operation of the 3D printer 100 in order to achieve a desired flowrate.

In some configurations, the 3D printer 100 may be capable of utilizing multiple different types of material to manufacture the target object 120. These different materials may comprise different combination of coreactive components. As such, the tool path generation unit 240 may receive an indication of a single material or set of materials to be used as the coreactive infill material 310 and/or the material for the physical boundary portion 300 to create the target object 120. In some cases, the 3D printer 100 is preconfigured to use only a single set of coreactive components within a single material type for all additive manufacturing.

Upon receiving the indication of the material, the tool path generation unit 240 accesses from a material database 246 characteristics of the material. In some cases, the indication of the material comprises a specific mixture of coreactive components. The characteristics of the material comprise a viscosity of the material and/or various other attributes relating to the reactivity of the material. Using the information from the material database 246 and the processes described above, the tool path generation unit 240 determines the target flow rate using characteristics of the material.

In some cases, the tool path generation unit 240 may receive the indication of the material to be used for the coreactive infill material 310 based upon characteristics of the material that was used to create the physical boundary portion 300. For example, the physical boundary portion 300 may comprise a material that has specific bonding characteristics. The computer system 110 may identify those bonding characteristics and communicate an indication of a material to the tool path generation unit 240 based upon those characteristics.

For instance, the physical boundary portion 300 may comprise a thermoplastic material. The computer system 110 may determine that a specific combination of coreactive components within a coreactive infill material 310 will create the strongest bond with the thermoplastic material. The computer system 110 communicates an indication of that material to the tool path generation unit 240 for generation of an appropriate tool path. Alternatively, the computer system 110 may determine that a particular combination of coreactive components within a coreactive infill material 310 will be corrosive to the thermoplastic material, and thus avoid that particular combination.

Similarly, the physical boundary portion 300 may comprise coreactive components within the boundary material. The tool path generation unit 240 may identify a particular set of coreactive components to include within the coreactive infill material 310 in order to create desired covalent bonding between the physical boundary portion 300 and the coreactive infill material 310. In some cases, an end user may desire specific performance attributes of the physical boundary portion 300 and the coreactive infill material 310. Further, the desired attributes may not be the same for the physical boundary portion 300 and the coreactive infill material 310. In such a case, the user may provide the desired coreactive components for each material and/or the tool path generation unit 240 may identify the desired coreactive components for the materials.

Additionally, in some configurations, the coreactive components may utilize an external stimulus, such as UV light during the reaction process. In such cases, the 3D printer 100 may comprise a UV light source that controllable by the computer system 110. The 3D printer 100 may be configurable to dispense the coreactive material and cure the material with a UV light source. Various other stimuli may be similarly implemented by the computer system 110 such that the stimuli are applied to the coreactive infill material during and/or after the dispensing of the coreactive infill material within the physical boundary portion 300.

Additionally, the dispenser control unit 250 may also be configured to allow the dispenser 130, 132 to coast during the first tool path. As used herein, "coast" refers to the ability of the dispenser 130 to continue along a tool path (e.g., the first tool path) while continuing to dispense coreactive material despite the 3D printer 100 no longer actively causing coreactive material to flow into the dispenser 130. The ability to coast is caused, at least in part, due to coreactive material that is within the dispenser 130 and portion of the 3D printer between the dispenser 130 and a holding container for the coreactive material. As such, when implementing the first tool path, the dispenser may dispense unwanted, excess coreactive material if it is not allowed to coast and drain the coreactive material within the system during the first tool path. Accordingly, the generation of the first tool path may comprise a portion where the dispenser is allowed to coast and continue to extrude remaining material that is within the dispenser.

Once the first tool path has been generated, the computer system 110 sends instructions to a dispenser 130, 132 that cause the dispenser 130 to implement the first tool path while flowing the boundary material to create the physical boundary portion 300. The boundary material may comprise coreactive components that are flowed in the form of the desired physical boundary portion 300 as directed by the first tool path.

The computer system 110 also generates a command to dispense the coreactive infill material 310 within the physical boundary portion 300. The command may comprise a command to an automated dispensing system or may comprise a command that is configured to cause a user interface to display an indication to pour the coreactive infill material within the physical boundary portion (such as the interface shown in FIG. 1) to instruct a user to dispense the coreactive infill material 310 within the physical boundary portion 300. As used herein, an "automated dispensing system" comprises any system that is capable of receiving electronic instructions to flow the coreactive infill material 310 within the physical boundary portion 300 and then to actuate an electric-mechanical motor to cause the coreactive infill material 310 to flow.

In some examples, the tool path generation unit 240 generates a command to dispense the coreactive infill material 310 within the physical boundary portion 300 by generating a second tool path to additively manufacture an infill portion that is located at least partly within the physical boundary portion 300. The tool path generation unit 240 sends instructions to the computer system 110 in communication with the dispenser 132 that cause the dispenser to implement the second tool path while flowing coreactive infill material 310 to create the infill portion. Additionally or alternatively, the tool path generation unit 240 sends instructions to a different dispenser 132 that implements the second tool path while flowing coreactive infill material 310 to create the infill portion. As such, the automated dispensing system may comprise a 3D printer 100, a particular dispenser 132 in a 3D printer 100, or any number of other systems that are capable of flowing the coreactive infill material 310.

Figure 3C:
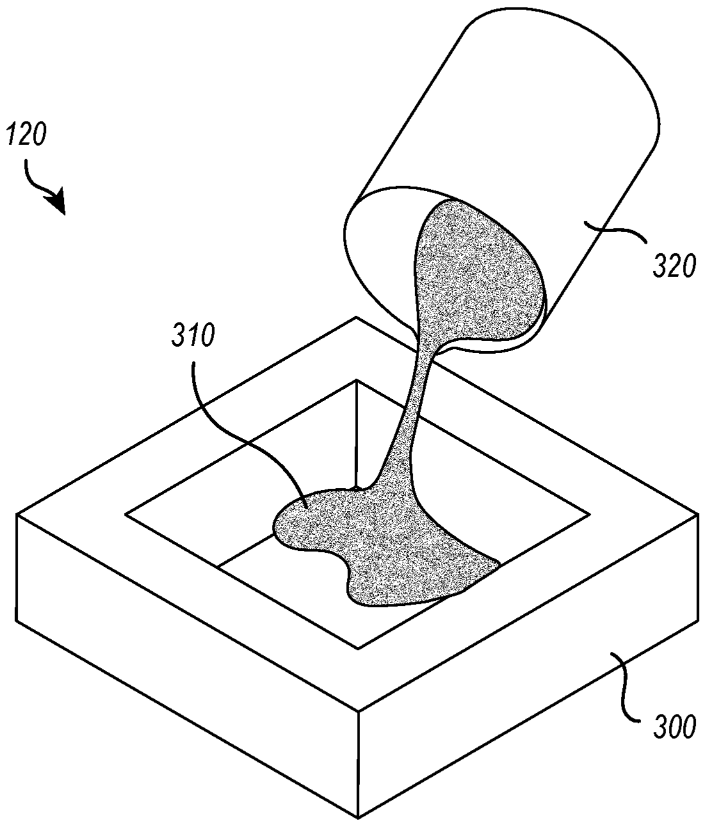
FIG. 3C illustrates a flow of coreactive infill material into the physical boundary portion of the example target object.

For example, FIG. 3C illustrates a flow of coreactive infill material 310 into the physical boundary portion 300 of the example target object 120. The depicted example, the coreactive infill material 310 is being poured from a container 320 into the physical boundary portion 300. The container 320 may be poured by hand or may comprise a portion of a mechanical machine that is configured to pour the contents of the container 320 on command. The coreactive infill material 310 may be premeasured such that the volume of material within the container 320 matches a desired volume.

Additionally, the contents of the container 320 may be poured at substantially a single area within the physical boundary portion 300. The viscosity of the coreactive infill material 310 may cause the material to spread out and completely fill the desired area. Additionally or alternatively, the computer system 110 may provide a timer during which time the coreactive infill material must be poured into the physical boundary portion 300. The timer may be based upon the amount of time before the material in the physical boundary portion 300 cures. It may be desirable for the coreactive infill material 310 to be poured before that time to better enable the coreactive components in the coreactive infill material 310 to chemically bond with the coreactive materials in the physical boundary portion 300.

Figure 3D:
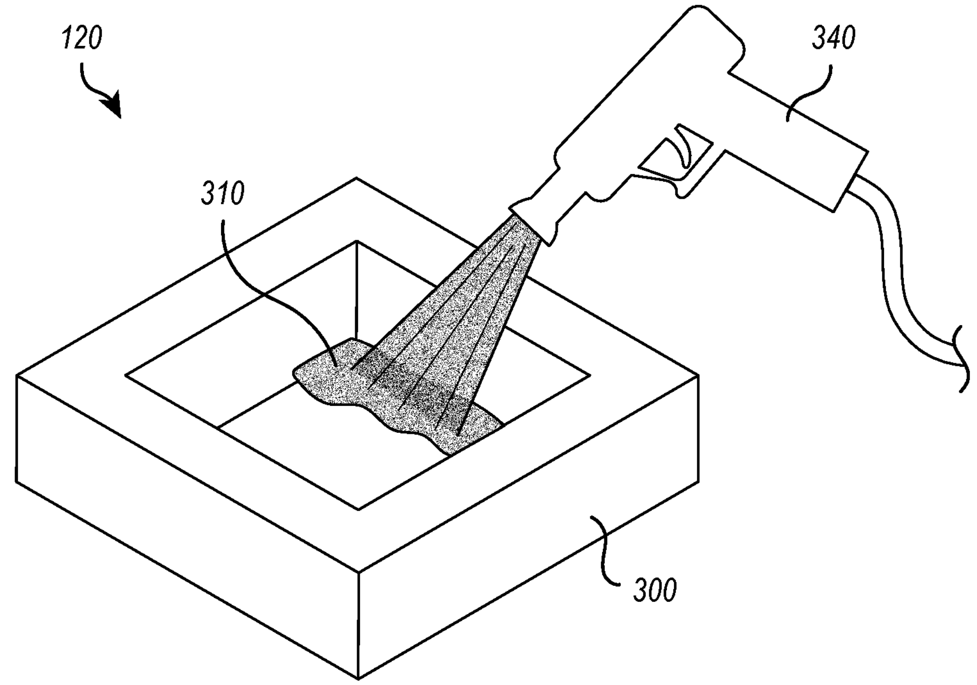
FIG. 3D illustrates another flow of coreactive infill material into the physical boundary portion of the example target object.

FIG. 3D illustrates another flow of coreactive infill material 310 into the physical boundary portion 300 of the example target object 120. In this depicted example, the coreactive infill material 10 is being sprayed into the physical boundary portion 300 within a sprayer 340. The sprayer 340 may be hand operated or may be automated such that the sprayer 340 comprises a portion of a mechanical machine that is configured to spray the coreactive infill material 310 on command. The sprayer 340 may comprise a sensor that indicates the amount of coreactive infill material 310 that has been sprayed, such that the sprayer 340 is able to flow the correct amount of coreactive infill material 310 into the physical boundary portion 300.

Additionally, the sprayer 340 may spray the coreactive infill material 310 at substantially a single area within the physical boundary portion 300. The viscosity of the coreactive infill material 310 may cause the material to spread out and completely fill the desired area. Additionally or alternatively, the computer system 110 may provide a timer during which time the coreactive infill material must be sprayed into the physical boundary portion 300. The timer may be based upon the amount of time before the material in the physical boundary portion 300 cures. It may be desirable for the coreactive infill material 310 to be sprayed before that time to better enable the coreactive components in the coreactive infill material 310 to chemically bond with the coreactive materials in the physical boundary portion 300.

While FIGS. 3C and 3D provide two specific examples for flowing coreactive infill material 310 into the physical boundary portion 300, one will appreciate that these are provided for the sake of example and explanation. Various other methods may be used to flow the coreactive infill material 310 into the physical boundary portion 300 and remain within the scope of the present invention.

Figure 4:
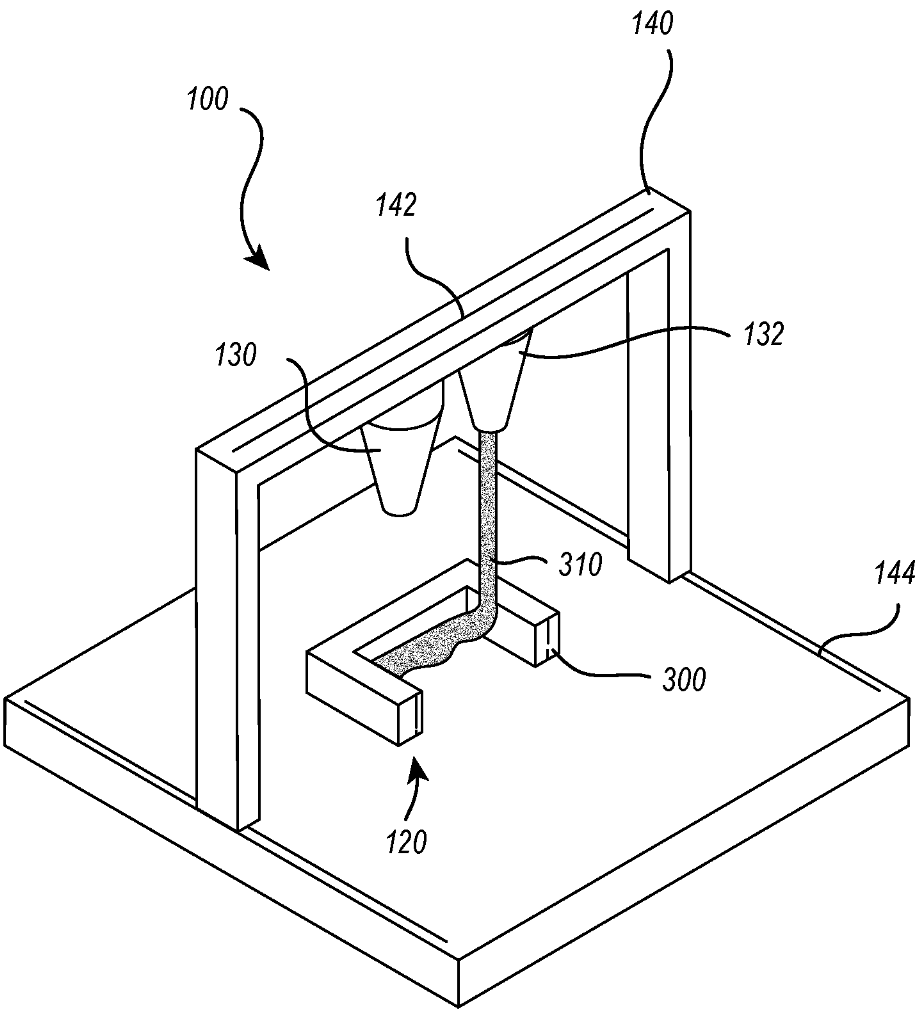
FIG. 4 illustrates a 3D printer being used for rapid object production using flow infill design.

FIG. 4 illustrates a 3D printer 100 being used for rapid object production using flow infill design. In the depicted example, the 3D printer 100 is additively manufacturing the physical boundary portion 300 with a first dispenser 130 and concurrently flowing coreactive infill material 310 into the physical boundary portion 300 from a second dispenser 132. As such, in some examples, the 3D printer 100 may be configured to operate two separate dispensers concurrently where one dispenser additively manufactures a physical boundary portion 300 and the other dispenser flows coreactive infill material 310 into the physical boundary portion 300.

In order to properly construct the desired target object 120, the computer system 110 calculate a viscosity of the coreactive infill material with its associated coreactive components. The computer system 110 may also calculate the speed at which the coreactive infill material would fill the physical boundary portion 300. Using this information, the computer system 110 calculates the amount of physical boundary portion 300 that must be created before the second dispenser 132 begins to flow the coreactive infill material 310 into the physical boundary portion 300. One will appreciate that failure to wait until enough of the physical boundary portion 300 is constructed before flowing the coreactive infill material 310 may cause the coreactive infill material 310 to run outside of the desired target object 120. In various configurations, the second dispenser 132 in FIG. 4 may comprise a dynamic nozzle, a static nozzle, injection device, a pouring device, a dispensing device, an extrusion device, a sprayer device, or any other device capable of providing a controlled flow of coreactive components.

Returning to FIG. 3B, which illustrates the completed target object 120 with the coreactive infill material 310 fully in place. The use of coreactive components to create the coreactive infill material can result in several desirable properties. For example, the coreactive infill material may be covalently bonded to the physical boundary portion 300 instead of the physical adhesion bonds that are often found in thermoplastic printing. Additionally, the resulting bonds within the coreactive infill material may be water tight and/or air tight.

In addition to or alternative to the above, the physical boundary portion 300 may be constructed through an additive manufacturing process using coreactive components, thermoplastic materials, and/or any other additive manufacturing. In some cases, the coreactive infill material 310 and the boundary material comprise the same composition. For example, the physical boundary portion 300 may be created from the same coreactive components as the coreactive infill material 310. Alternatively, the physical boundary portion 300 may comprise different coreactive components than the coreactive infill material 310.

Additionally, as depicted in FIG. 1, the 3D printer 100 may comprise multiple separate dispensers 130, 132. The dispensers 130, 132 may be used for different types of materials, such as a dispenser for different types of coreactive materials. For example, the dispensers may dispense different coreactive components at particular flow rates in order to produce a final coreactive material that comprises a target volume mix ratio. One will appreciate, though, that similar control of the coreactive components in a material to achieve a target volume mix ratio may be practiced with a single dispenser 130. For instance, the 3D printer 100 may comprise a mixing apparatus that dynamically mixes coreactive components from different containers at a desired rate.

As stated above, the coreactive infill material 310 may comprise a mixture of two different materials, such as different reactive components. Additionally, the two different materials within the coreactive infill material 310 may be dispensed as a gradient. For example, two particular coreactive components within the coreactive infill material 310 may provide different properties based upon the volume mix ratio of the two coreactive components. As an example, the volume mix ratio of the two particular coreactive components may impact the flexibility of the resulting coreactive infill material. As such, the tool path generation unit 240 can calculate a volume mix ratio of components within the coreactive infill material 310 that changes as the coreactive infill material 310 is flowed into the physical boundary portion 300.

Figure 5:
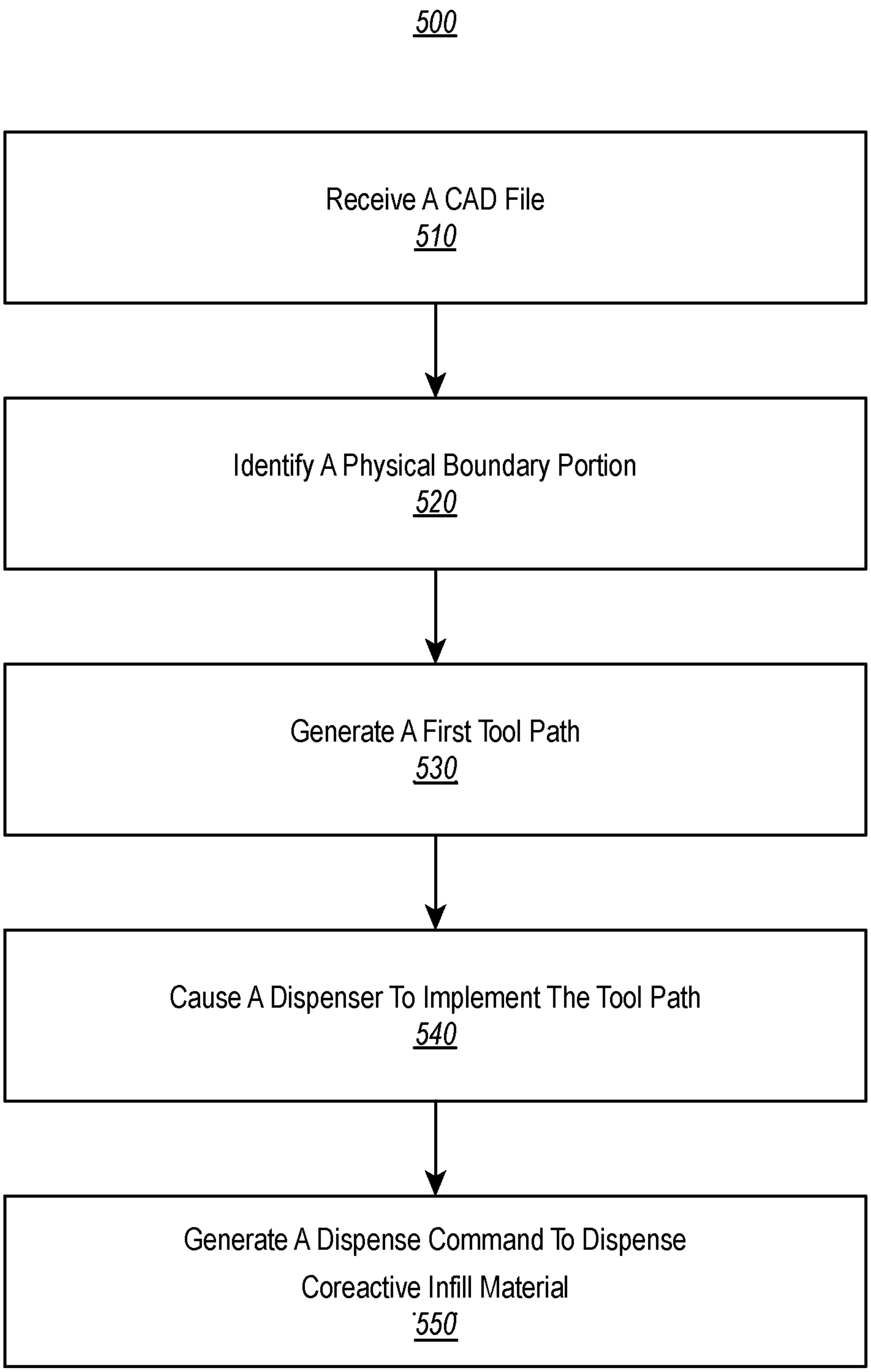
FIG. 5 shows a flowchart of steps in a method for rapid object production using flow infill design.

FIG. 5 shows a flowchart of steps in a method 500 for rapid object production using flow infill design. The depicted method 500 includes an act 510 of receiving a CAD file. Act 510 comprises receiving, at one or more processors, a computer-aided design (CAD) file that describes physical dimensions of a target object. For example, as depicted and described with respect to FIG. 2, the CAD processing unit 230 receives a CAD file of a target object 120.

Method 500 also includes an act 520 of identifying a physical boundary within the CAD file. Act 520 comprises identifying, with the one or more processors, a physical boundary portion of the target object within the CAD file, wherein the physical boundary portion comprises a portion of the target object that encloses a coreactive infill material. For example, as depicted and described with respect to FIGS. 2, 3B, and 3C, the CAD processing unit 230 is configured to identify a physical boundary portion 300 of the target object 120.

Additionally, method 500 includes an act 530 of generating a first tool path. Act 530 comprises generating a first tool path to additively manufacture the physical boundary portion 300. For example, as depicted and described with respect to FIG. 2, the tool path generation unit 240 generates a first tool path that is configured to create the physical boundary portion 300.

Further, method 500 includes an act 540 of causing a dispenser to implement the tool path. Act 540 comprises sending instructions to a computer system 110 in communication with a dispenser 130 that cause the dispenser 130 to implement the first tool path while dispensing a boundary material. For example, as depicted in FIGS. 1 and 4, a dispenser 130 in the 3D printer 100 additively manufactures the physical boundary portion 300.

Further still, method 500 includes an act 550 of generating a dispense command to dispense coreactive infill material. Act 550 comprises generating a command to dispense the coreactive infill material 310 within the physical boundary portion 300. For example, as depicted and described with respect to FIGS. 3C, 3D, and 4, the computer system 110 communicates instructions to an electric mechanical apparatus or to an end user that indicates a command to flow coreactive infill material 310 into the physical boundary portion 300.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention is further specified in the following clauses.

Clause 1: A computer system for part production using flow infill design, comprising:

one or more processors; and one or more computer-readable media having stored thereon executable instructions that when executed by the one or more processors configure the computer system to perform at least the following:

receive a computer-aided design (CAD) file that describes physical dimensions of a target object;

identify a physical boundary portion of the target object within the CAD file, wherein the physical boundary portion comprises a portion of the target object that is configured to enclose a coreactive infill material;

generate a first tool path to additively manufacture the physical boundary portion;

send instructions to a dispenser that cause the dispenser to implement the first tool path while dispensing a boundary material; and generate a command to dispense the coreactive infill material within the physical boundary portion.

Clause 2: The computer system of clause 1, wherein the boundary material comprises a coreactive material, preferably at least two coreactive components, preferably two coreactive components, more preferably two coreactive components that are different.

Clause 3: The computer system of clauses 1 or 2, wherein the coreactive infill material chemically bond with the boundary material, preferably coreactive components of the coreactive infill material chemically bond with coreactive components of the boundary material.

Clause 4: The computer system of any of clauses 1 to 3, wherein dispensing of the boundary material and infill material occurs simultaneously.

Clause 5: The computer system of any of clauses 1 to 4, wherein the executable instructions include instructions that are executable to configure the computer system to: calculate the speed at which the coreactive infill material fills the physical boundary portion based on the progress of additively manufacturing the physical boundary portion in order to avoid that the coreactive infill material run outside the portion of the target object that is configured to enclose a coreactive infill material and the command to dispense the coreactive infill material further includes the calculated speed at which the coreactive infill material fills the physical boundary portion.

Clause 6: The computer system of any of clauses 1 to 5, wherein the coreactive infill material is poured by hand, by a portion of a mechanical machine that is configured to pour the contents of a container on command or sprayed within the physical boundary portion.

Clause 7: The computer system of any of clauses 1 to 6, wherein the generation of the first tool path considers the viscosity and/or the reaction rate of the boundary material in order to adjust the flow rate, tool path and/or the travel speed of the dispenser along a path that will create the physical boundary so that the successive layers can be coreacted to form covalent bonds between the successive layers during the additive manufacturing of the physical boundary portion.

Clause 8: The computer system of any of clauses 1 to 7, wherein the instructions for additively manufacture the physical boundary portion send to the dispenser include the flow rate, tool path and/or travel speed for the dispenser along a path that will create the physical boundary.

Clause 9: The computer system of any of clauses 1 to 8, wherein the coreactive infill material comprises at least two coreactive components, preferably the coreactive infill material comprises a thermoset material.

Clause 10: The computer system of any of clauses 1 to 9, wherein the coreactive infill and the boundary material comprises the same coreactive components or different coreactive components.

Clause 11: The computer system of any of clauses 1 to 10, wherein the executable instructions include instructions that are executable to configure the computer system to: receiving instructions from the CAD file relating to the type of coreactive infill material and/or boundary material that is to be used to create the target object.

Clause 12: The computer system of any of clauses 1 to 11, wherein the executable instructions include instructions that are executable to configure the computer system to: receiving characteristics of the boundary material and/or the coreactive infill material, such as coreactive components of the boundary material and/or the coreactive infill material, from a material database, wherein the characteristics of the materials comprise a viscosity of the boundary material and/or the coreactive infill material, and/or the reaction rate of the boundary material and/or the coreactive infill material, preferably these information are used to generate the first and/or second tool path, particularly to generate the flow rate, tool path and/or travel speed for the dispenser along a path that will create the physical boundary.

Clause 13: The computer system of any of clauses 1 to 12, wherein the executable instructions include instructions that are executable to configure the computer system to: calculating the volume of coreactive infill material based on the volume within the physical boundary portion and the command to dispense the coreactive infill material within the physical boundary portion additional includes the calculated volume to be dispensed.

Clause 14: The computer system of any of clauses 1 to 13, wherein the viscosity of the infill material at 25° C. and a shear rate at 0.1 $s^{-1}$ is from 100 to 5000 cP, preferably 300 to 3000 cP, more preferably 800 to 1800 cP, measured using an Anton Paar MCR 301 or 302 rheometer with a gap from 1 mm to 2 mm.

Clause 15: The computer system of any of clauses 1 to 14, wherein the executable instructions include instructions that are executable to configure the computer system to:

generate the command to dispense the coreactive infill material within the physical boundary portion by generating a second tool path to additively manufacture an infill portion that is located at least partly within the physical boundary portion; and send instructions to the computer system in communication with the dispenser that cause the dispenser to implement the second tool path while flowing coreactive infill material to create the infill portion.

Clause 16: The computer system of any of clauses 1 to 15, wherein the executable instructions include instructions that are executable to configure the computer system to:

generate the command to dispense the coreactive infill material within the physical boundary portion by generating a second tool path to additively manufacture an infill portion that is located at least partly within the physical boundary portion; and send instructions to the computer system in communication with another dispenser that cause the other dispenser to implement the second tool path while flowing coreactive infill material to create the infill portion.

Clause 17: The computer system of any of clauses 1 to 16, wherein the coreactive infill material and the boundary material comprise the same composition.

Clause 18: The computer system of any of clauses 1 to 17, wherein the coreactive infill material comprises a coreactive infill material and the boundary material comprises a thermoplastic Clause 19: The computer system of any of clauses 1 to 18, wherein the command to dispense the coreactive infill material within the physical boundary portion comprises a command that is configured to cause a dispenser to pour the coreactive infill material within the physical boundary portion.

Clause 20: The computer system of any of clauses 1 to 19, wherein the command to dispense the coreactive infill material within the physical boundary portion comprises a command that is configured to cause a user interface to display an indication to pour the coreactive infill material within the physical boundary portion.

Clause 21: The computer system of any of clauses 1 to 20, wherein the coreactive infill material comprises a mixture of two different coreactive materials.

Clause 22: The computer system of any of clauses 1 to 21, wherein a volume mix ration of the mixture of the two different coreactive materials is varied while dispensing such that a gradient of the two different coreactive materials is created.

Clause 22: A system comprising a computer system according to clauses 1 to 22 and a 3D printer, in communication with the computer system, comprising a dispenser.

Clause 23: A method executed by one or more processors for part production using flow infill design, as in particular performing the stored executable instructions of any of clauses 1 to 22, comprising:

receiving a computer-aided design (CAD) file that describes physical dimensions of a target object;

identifying a physical boundary portion of the target object within the CAD file, wherein the physical boundary portion comprises a portion of the target object that is configured to enclose a coreactive infill material;

generating a first tool path to additively manufacture the physical boundary portion;

sending instructions to a dispenser that cause the dispenser to implement the first tool path while dispensing a boundary material; and generating a command to dispense the coreactive infill material within the physical boundary portion.

Clause 24: The method of clause 23, wherein the boundary material comprises a coreactive material.

Clause 25: The method of clauses 23 or 24, further comprising:

Generating the command to dispense the coreactive infill material within the physical boundary portion by generating a second tool path to additively manufacture an infill portion that is located at least partly within the physical boundary portion; and sending instructions to the computer system in communication with the dispenser that cause the dispenser to implement the second tool path while flowing coreactive infill material to create the infill portion.

Clause 26: The method of any of clauses 23 to 25, further comprising:

generating the command to dispense the coreactive infill material within the physical boundary portion by generating a second tool path to additively manufacture an infill portion that is located at least partly within the physical boundary portion; and sending instructions to the computer system in communication with another dispenser that cause the other dispenser to implement the second tool path while flowing coreactive infill material to create the infill portion.

Clause 27: The method of any of clauses 23 to 26, wherein the coreactive infill material and the boundary material comprise the same composition.

Clause 28: The method of any of clauses 23 to 27, wherein the coreactive infill material comprises a coreactive and the boundary material comprises a thermoplastic.

Clause 29: The method of any of clauses 23 to 28, wherein the command to dispense the coreactive infill material within the physical boundary portion comprises a command that is configured to cause a dispenser to pour the coreactive infill material within the physical boundary portion.

Clause 30: The method of any of clauses 23 to 29, wherein the command to dispense the coreactive infill material within the physical boundary portion comprises a command that is configured to cause a user interface to display an indication to pour the coreactive infill material within the physical boundary portion.

Clause 31: The method of any of clauses 23 to 30, wherein the coreactive infill material comprises a mixture of two different coreactive materials.

Clause 32: The method of any of clauses 23 to 31, wherein a volume mix ration of the mixture of the two different coreactive materials is varied while dispensing such that a gradient of the two different coreactive materials is created.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for part production using flow infill design, comprising:

one or more processors; and one or more computer-readable media having stored thereon executable instructions that when executed by the one or more processors configure the computer system to perform at least the following:

receive a computer-aided design (CAD) file that describes physical dimensions of a target object;

identify a physical boundary portion of the target object within the CAD file, wherein the physical boundary portion comprises a portion of the target object that is configured to enclose a coreactive infill material;

generate a first tool path to additively manufacture the physical boundary portion, wherein a target flow rate is calculated which accounts for a reactive time of one or more coreactive materials;

send instructions to a dispenser that cause the dispenser to implement the first tool path while dispensing a boundary material, wherein the instructions comprise dynamic adjustments along the first tool path to mix ratios of multiple coreactive materials based upon material properties of at least one of the multiple coreactive materials; and generate a command to dispense the coreactive infill material within the physical boundary portion, wherein generating the command to dispense the coreactive infill material comprises:

identifying a particular set of coreactive materials to include within the infill material in order to create at least the following:

covalent bonding between the physical boundary portion and the coreactive infill material, and specific performance attributes of the coreactive infill material, wherein the specific performance attributes of the coreactive infill material are not the same for the physical boundary portion.

2. The computer system of claim 1, wherein the executable instructions include instructions that are executable to configure the computer system to:

generate the command to dispense the coreactive infill material within the physical boundary portion by generating a second tool path to additively manufacture an infill portion that is located at least partly within the physical boundary portion; and send instructions to the dispenser that cause the dispenser to implement the second tool path while flowing coreactive infill material to create the infill portion.

3. The computer system of claim 1, wherein the executable instructions include instructions that are executable to configure the computer system to:

generate the command to dispense the coreactive infill material within the physical boundary portion by generating a second tool path to additively manufacture an infill portion that is located at least partly within the physical boundary portion; and send instructions to another dispenser that cause the other dispenser to implement the second tool path while flowing coreactive infill material to create the infill portion.

4. The computer system of claim 1, wherein the coreactive infill material and the boundary material comprise different ratios of the same coreactive materials.

5. The computer system of claim 1, wherein the coreactive infill material comprises a coreactive infill material and the boundary material comprises a thermoplastic.

6. The computer system of claim 1, wherein the command to dispense the coreactive infill material within the physical boundary portion comprises a command that is configured to cause a particular dispenser to pour the coreactive infill material within the physical boundary portion.

7. The computer system of claim 1, wherein the command to dispense the coreactive infill material within the physical boundary portion comprises a command that is configured to cause a user interface to display an indication to pour the coreactive infill material within the physical boundary portion.

8. The computer system of claim 1, wherein the computer system comprises a three-dimensional printer.

9. A method for part production using flow infill design, comprising when executed by one or more processors:

receiving a computer-aided design (CAD) file that describes physical dimensions of a target object;

identifying a physical boundary portion of the target object within the CAD file, wherein the physical boundary portion comprises a portion of the target object that is configured to enclose a coreactive infill material;

generating a first tool path to additively manufacture the physical boundary portion, wherein a target flow rate is calculated which accounts for a reactive time of one or more coreactive materials;

sending instructions to a dispenser that cause the dispenser to implement the first tool path while dispensing a boundary material, wherein the instructions comprises dynamic adjustments along the first tool path to mix ratios of multiple coreactive materials based upon material properties of at least one of the multiple coreactive materials; and generating a command to dispense the coreactive infill material within the physical boundary portion, wherein generating the command to dispense the coreactive infill material comprises:

identifying a particular set of coreactive materials to include within the infill material in order to create at least the following:

covalent bonding between the physical boundary portion and the coreactive infill material, and specific performance attributes of the coreactive infill material, wherein the specific performance attributes of the coreactive infill material are not the same for the physical boundary portion.

10. The method as recited in claim 9, wherein the boundary material comprises a coreactive material.

11. The method as recited in claim 9, further comprising:

generating the command to dispense the coreactive infill material within the physical boundary portion by generating a second tool path to additively manufacture an infill portion that is located at least partly within the physical boundary portion; and sending instructions to the dispenser that cause the dispenser to implement the second tool path while flowing coreactive infill material to create the infill portion.

12. The method as recited in claim 9, further comprising:

generating the command to dispense the coreactive infill material within the physical boundary portion by generating a second tool path to additively manufacture an infill portion that is located at least partly within the physical boundary portion; and sending instructions to another dispenser that cause the other dispenser to implement the second tool path while flowing coreactive infill material to create the infill portion.

13. The method as recited in claim 9, wherein the coreactive infill material comprises a coreactive and the boundary material comprises a thermoplastic.

14. The method as recited in claim 9, wherein the command to dispense the coreactive infill material within the physical boundary portion comprises a command that is configured to cause a particular dispenser to pour the coreactive infill material within the physical boundary portion.

15. The method as recited in claim 9, wherein the command to dispense the coreactive infill material within the physical boundary portion comprises a command that is configured to cause a user interface to display an indication to pour the coreactive infill material within the physical boundary portion.

16. The method as recited in claim 9, wherein a volume mix ratio of the mixture of the two different coreactive materials is varied while dispensing such that a gradient of the two different coreactive materials is created.

* * * * *